United States Patent
Serikawa et al.

(10) Patent No.: US 6,902,863 B2
(45) Date of Patent: Jun. 7, 2005

(54) INFRARED-SENSITIVE PHOTOSENSITIVE COMPOSITION

(75) Inventors: Takeshi Serikawa, Shizuoka (JP); Ikuo Kawauchi, Shizuoka (JP); Mitsumasa Tsuchiya, Shizuoka (JP); Ippei Nakamura, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 7 days.

(21) Appl. No.: 10/390,662

(22) Filed: Mar. 19, 2003

(65) Prior Publication Data

US 2003/0203312 A1 Oct. 30, 2003

(30) Foreign Application Priority Data

Mar. 20, 2002 (JP) ........................................ 2002-077817
Mar. 22, 2002 (JP) ........................................ 2002-081044

(51) Int. Cl.$^7$ .............................................. G03F 7/004
(52) U.S. Cl. ................................ 430/281.1; 430/283.1; 430/286.1; 430/287.1; 430/288.1
(58) Field of Search ........................... 430/270.1, 281.1, 430/282.1, 283.1, 284.1, 286.1, 287.1, 288.1

(56) References Cited

FOREIGN PATENT DOCUMENTS

| | | |
|---|---|---|
| EP | 0 287 212 A1 | 10/1988 |
| EP | 0 855 620 A1 | 7/1998 |
| JP | 46-27919 A | 8/1971 |
| JP | 56-69192 A | 6/1981 |
| JP | 7-285275 A | 10/1995 |
| JP | 10-282643 A | 10/1998 |
| JP | 2001-324808 A | 11/2001 |
| JP | 2002-23358 A | 1/2002 |

OTHER PUBLICATIONS

European Search Report dated Feb. 23, 2004.

*Primary Examiner*—Barbara L. Gilliam
(74) *Attorney, Agent, or Firm*—Sughrue Mion, PLLC

(57) ABSTRACT

An infrared-sensitive photosensitive composition comprising:
(A) a resin;
(B) a novolak resin; and
(C) a light-to-heat converting substance,
wherein the resin (A) has, as copolymer components, at least: (1) a (meth)acrylic acid or a monomer represented by formula (I) as defined herein; and (2) at least one compound selected from the group consisting of a (meth)acrylic ester, a (meth)acrylamide derivative, and a styrene derivative.

5 Claims, No Drawings

INFRARED-SENSITIVE PHOTOSENSITIVE COMPOSITION

FIELD OF THE INVENTION

The present invention relates to an infrared-sensitive photosensitive composition, in particular, relates to an infrared-sensitive photosensitive composition for use in the image-forming layer of a positive lithographic printing plate precursor for so-called direct plate-making capable of directly plate-making from digital signals such as computer data.

BACKGROUND OF THE INVENTION

As the system of directly plate-making from digital signals such as computer data, systems by (1) electrophotography, (2) photopolymerization by combination of exposure by Ar laser and post-heating, (3) lamination of a silver salt photosensitive material on a photosensitive resin, (4) a silver master type, and (5) breakdown of a silicone rubber layer by discharge breakdown and laser beams are known.

However, a method of using electrophotography of (1) is complicated in processes such as electrification, exposure and development, and requires intricate and large-scaled equipment. A method (2) requires highly sensitive printing materials over and above a post-heating process, and handling in daylight is difficult. Since methods (3) and (4) use silver salts, processing is complicated and uneconomical. A method (5) is a method of comparatively reaching completion, but a problem of the elimination of silicone residues on a plate remains.

On the other hand, the development of laser in recent years is remarkable, in particular, small-sized solid state lasers and semiconductor lasers having emission regions in near infrared to infrared of high output are easily available. The laser is very useful as the exposure light source of direct plate-making from digital signals such as computer data in the aspects of the compaction of the plate-making system, the environmental lights at plate-making work and the costs of plate-making materials.

As conventional lithographic printing plate materials, Japanese Patent Publication No. 27919/1971 discloses a method of forming an image by heating, in accordance with data, a printing material containing a recording layer to which a polymer compound or a composition which is insoluble or slightly soluble before heating and becomes more soluble in a solvent under heating is mixed, and Japanese Patent Laid-Open No. 69192/1981 discloses a heat-sensitive recording material having a heat-sensitive layer containing a novolak type phenol resin and a carbon black. However, these patents disclose only the examples of the case where images are recorded without using laser beams, and when images are recorded by lasers having emission regions from near infrared to infrared as the exposure light sources in the case of directly plate-making from digital data such as computers, good printed substances cannot necessarily be obtained due to background staining and the reduction of press life. For obtaining good printed substances, it is necessary that an exposed area (a non-image area) should be easily dissolved and an unexposed area (an image area) remain by alkali development processing after exposure and the remaining image area have good durability. That is, it is thought that since the recording property of the image is not good, the non-image area is dissolved with difficulty and the image area is easily dissolved when laser beams are used in the above well-known techniques.

To cope with these problems in prior techniques, Japanese Patent Laid-Open No. 285275/1995 discloses to use, as the image-forming layer, an image-recording material containing a binder, a substance which absorbs light and generates heat, and a substance which is heat-decomposable and substantially reduces the solubility of the binder in the state not being decomposed, to thereby obtain a lithographic printing plate material having good recording property capable of directly plate-making from digital signals such as computer data by using conventional processing apparatus and printing press as they are.

Further, Japanese Patent Laid-Open No. 215693/2001 discloses an image-forming material having a positive image-forming layer containing an acid generator and an acid-decomposable compound.

Further, Japanese Patent Laid-Open No. 282643/1998 discloses that for a positive photosensitive composition containing a light-to-heat converting substance and an alkali-soluble resin to contain an organic acid, the residual film rate in an unexposed area can be improved.

Moreover, Japanese Patent Laid-Open No. 324808/2001 discloses a positive photosensitive composition containing in specific weight ratios of a light-to-heat converting substance, a novolak resin, and an acrylate resin containing a (meth)acrylic acid and a (meth)acrylic ester, and high speed and the improvement of the residual film rate in an unexposed area can be obtained.

However, in the above-disclosed techniques, further improvement is desired in the points of processability (development latitude) and press life in the case where the activity of a developing solution changes.

SUMMARY OF THE INVENTION

An object of the present invention is to overcome the drawbacks of prior art techniques and provide an infrared-sensitive photosensitive composition which shows excellent processability (development latitude) even by a fatigued developing solution lowered in activity and press life when used in the image-forming layer and the like of a lithographic printing plate precursor.

The above object of the present invention has been attained by the following means.

(1) An infrared-sensitive photosensitive composition comprising:

(A) a resin, (B) a novolak resin, and (C) a light-to-heat converting substance, wherein the resin (A) has, as copolymer components, at least (1): a (meth)acrylic acid or a monomer represented by formula (I); and (2) at least one compound selected from a (meth) acrylic ester, a (meth)acrylamide derivative, and a styrene derivative:

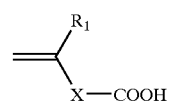

(I)

wherein $R_1$ represents a hydrogen atom or an alkyl group; and X represents an arylene group or one of groups represented by the following formulae:

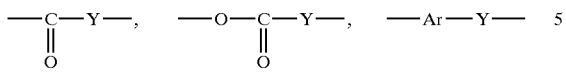

wherein Y represents a divalent linking group; and Ar represents an arylene group.

(2) The infrared-sensitive photosensitive composition, according to the above (1), wherein the component (1) is a (meth) acrylic acid, and the component (2) is at least one compound selected from the group consisting of a (meth) acrylamide derivative and a styrene derivative.

(3) The infrared-sensitive photosensitive composition, according to the above (1), wherein the component (1) is a monomer represented by formula (I):

(I)

wherein $R_1$ represents a hydrogen atom or an alkyl group, and X represents an arylene group which may have a substituent or one of groups represented by the following formulae:

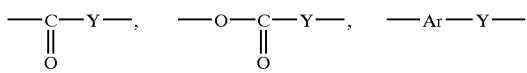

wherein Y represents a divalent linking group, and Ar represents an arylene group which may have a substituent.

(4) The infrared-sensitive photosensitive composition, according to the above (1), wherein X represents an arylene group.

(5) The infrared-sensitive photosensitive composition, according to the above (1), wherein X represents one of groups represented by the following formulae:

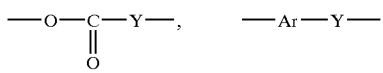

wherein Y represents a divalent linking group, and Ar represents an arylene group.

6) The infrared-sensitive photosensitive composition, according to the above (1), wherein X represents a group represented by the following formula:

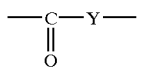

wherein Y represents $-NR_2-Z-$, $R_2$ represents a hydrogen atom or an alkyl group, and Z represents a divalent linking group.

7) The infrared-sensitive photosensitive composition, according to the above (1), wherein the component (1) is a monomer selected from the group consisting of the following compounds (a-29), (a-33), (a-34), (a-35) and (a-36):

a-29
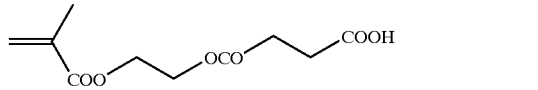

a-33
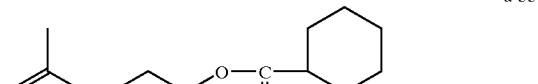

a-34
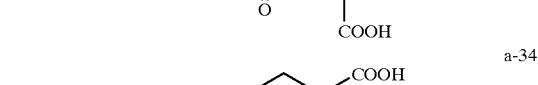

a-35

a-36
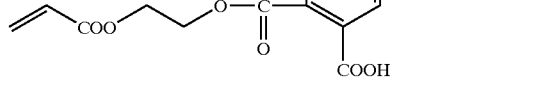

According to the above means, an infrared-sensitive photosensitive composition which shows excellent development latitude and press life can be obtained without using an acid-decomposable compound.

DETAILED DESCRIPTION OF THE INVENTION

The infrared-sensitive photosensitive composition in the present invention is described in detail below.

In the first place, the case where the resin (A) (hereinafter the resin (A) is sometimes referred to as the resin (A) or the component (A)) is an acrylate resin is described.

That is, the case where the acrylate resin (A) which can be used in the infrared-sensitive photosensitive composition in the present invention preferably has, as copolymer components, at least (1) at least one (meth)acrylic acid, and (2) at least one (meth)acrylamide derivative or styrene derivative is described. (Respective copolymer components are sometimes referred to as copolymer component (1) and copolymer component (2).)

In this case, copolymer component (1) of the resin (A) comprises at least one (meth)acrylic acid.

In this specification, acrylic and methacrylic are comprehensively called (meth)acrylic. The terms "including a (meth)acrylic acid as the copolymer component" means that at least either an acrylic acid or a methacrylic acid is contained as the copolymer component. This is similarly applied to the (meth)acrylamide derivative described later.

The content of a (meth)acrylic acid of acrylate resin (A) is preferably from 2 to 50 mol % in acrylate resin (A), more preferably from 5 to 40 mol %, and still more preferably from 10 to 30 mol %. When the content of a (meth)acrylic acid is smaller than the above range, alkali developability lowers, and when the content is greater than that range, the film residual rate disadvantageously lowers.

In the next place, the case where the resin (A) which can be used in the infrared-sensitive photosensitive composition in the present invention preferably has, as copolymer components, at least (1) at least one monomer represented by formula (I), and (2) at least one compound selected from the group consisting of a (meth)acrylic ester, a (meth)acrylamide derivative, and a styrene derivative is described. (Respective copolymer components are sometimes referred to as copolymer component (1) and copolymer component (2).)

In this specification, acrylic and methacrylic are comprehensively called (meth)acrylic. The terms "including a (meth)acrylic ester as the copolymer component" means that at least either an acrylic ester or a methacrylic ester is contained as the copolymer component. This is similarly applied to the (meth)acrylamide derivative described later.

The copolymer component (1) of the resin (A) which is used in the infrared-sensitive photosensitive composition in the present invention comprises at least one monomer represented by formula (I).

In formula (I), $R_1$ represents a hydrogen atom or an alkyl group, and preferably a hydrogen atom or an alkyl group having from 1 to 4 carbon atoms.

X represents an arylene group which may have a substituent or any of the following formulae:

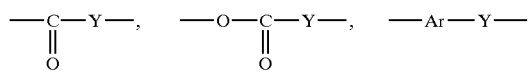

wherein Y represents a divalent linking group, and Ar represents an arylene group. Y and Ar may have a substituent.

As the divalent linking group represented by Y, an alkylene group, an arylene group, an imino group and an aryleneoxy group each of which may have a substituent are exemplified. The examples of the substituents include an alkyl group, a hydroxyl group, an alkoxyl group, a halogen atom, a phenyl group, a dimethylamino group, an ethylene oxide group, a vinyl group, and an o-carboxybenzoyloxy group.

When X represents —C(=O)—Y—, Y may be —NR$_2$—Z— wherein $R_2$ represents a hydrogen atom or an alkyl group, Z represents a divalent linking group. As the divalent linking group represented by Z, the same group as the above-mentioned Y can be exemplified.

The specific examples of monomers represented by formula (I) are shown below, but the present invention is not limited thereto.

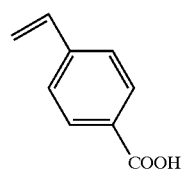

a-1

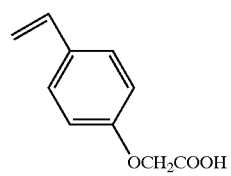

a-2

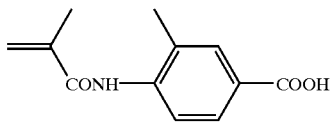

a-3

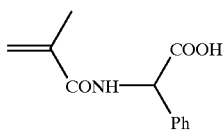

a-4

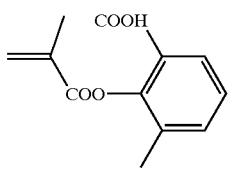

a-5

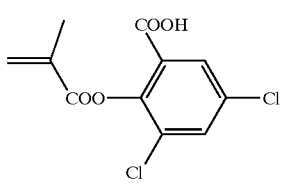

a-6

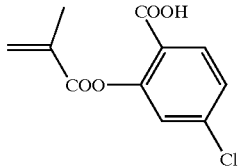

a-7

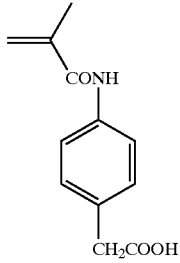

a-8

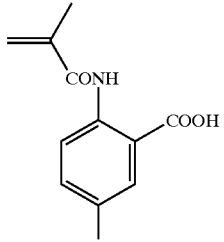

a-9

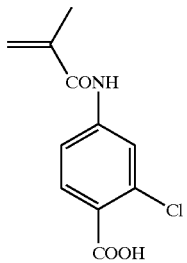

a-10

-continued
a-11 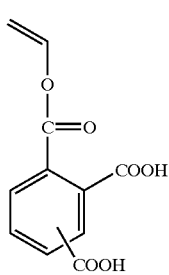
a-12 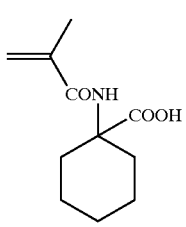
a-13 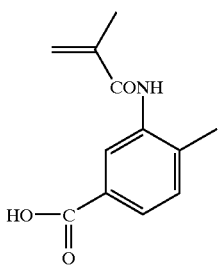
a-14, 15 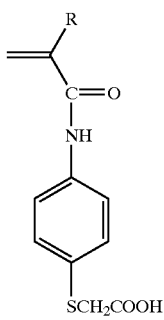
a-14: R = —H, a-15: R = —CH$_3$
a-16 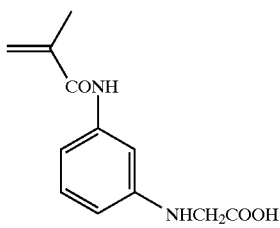
a-17 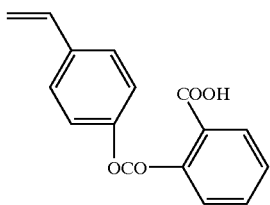
-continued
a-18, 19, 20 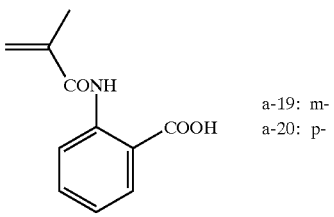
a-19: m-
a-20: p-
a-21 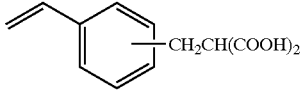
a-22, 23, 24 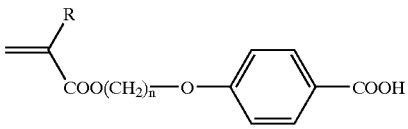
a-22: R = —CH$_3$, n = 4
a-23: R = —CH$_3$, n = 6
a-24: R = —H, n = 6
a-25 
a-26 
a-27 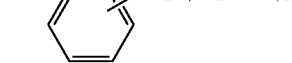
a-28 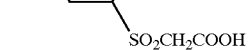
a-29
a-30
a-31 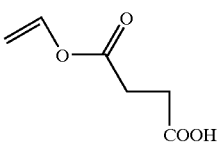

-continued

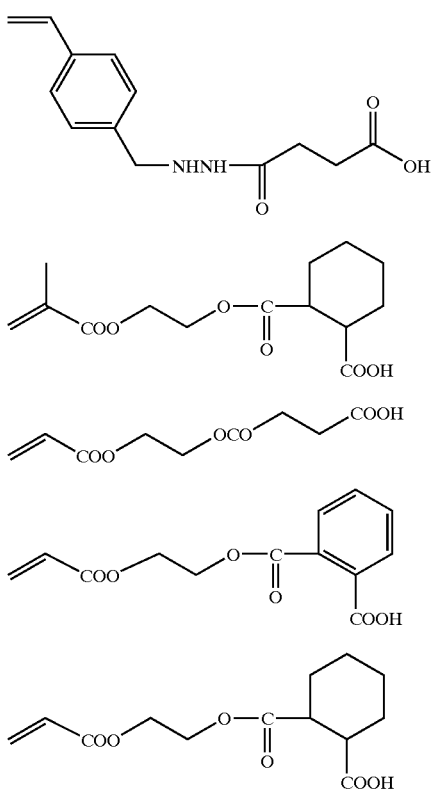

a-32 a-33 a-34 a-35 a-36

Among the examples of monomers represented by formula (I) as above, the compounds (a-29), (a-33), (a-34), (a-35) and (a-36) are preferable.

The content of a monomer represented by formula (I) in the resin (A) is preferably from 1 to 90 mol %, more preferably from 2 to 50 mol %, and still more preferably from 5 to 30 mol %. When the content of a monomer is smaller than the above range, alkali developability lowers, and when the content is greater than that range, the film residual rate disadvantageously lowers.

The copolymer component (2) of the resin (A) comprises at least one compound selected from the group consisting of a (meth)acrylic ester, a (meth)acrylamide derivative, and a styrene derivative. The copolymer component (2) may comprise one compound selected from a (meth)acrylic ester, a (meth)acrylamide derivative, and a styrene derivative, may comprise arbitrary two of these compounds, or may comprise three or more compounds. That is, e.g., the copolymer component (2) of the resin (A) may comprise four kinds in total of two compounds selected from (meth)acrylic esters and two compounds selected from styrene derivatives.

The (meth) acrylic ester of the copolymer component (2) in the present invention is a substituted or unsubstituted alkyl ester or aryl ester. As the alkyl group, e.g., methyl, ethyl, n-propyl, isopropyl, n-butyl, isobutyl, t-butyl, n-hexyl, n-heptyl, n-octyl and 2-ethylhexyl are exemplified. As the aryl group, e.g., phenyl, 1-naphthyl, 2-naphthyl and benzyl are exemplified. The alkyl group and aryl group may be substituted and, e.g., a hydroxyl group, an alkoxyl group, a halogen atom, a phenyl group, a dimethylamino group, an ethylene oxide group, a vinyl group, and an o-carboxybenzoyloxy group are exemplified as the substituents.

As the acrylic esters in the present invention, methyl acrylate, methyl methacrylate, ethyl methacrylate, isopropyl methacrylate and n-butyl methacrylate are preferably used.

The (meth)acrylic esters may be used alone or in combination of two or more in the present invention.

The content of (meth)acrylic esters in the resin (A) is preferably from 0 to 95 mol %, more preferably from 5 to 90 mol %, and still more preferably from 10 to 80 mol %.

The (meth)acrylamide derivatives which constitute the copolymer component (2) of the present invention are not especially restricted so long as they are derivatives of (meth)acrylamide, however, a (meth)acrylamide derivative represented by formula (c) is preferably used:

(c)

wherein $R_1$ represents a hydrogen atom or an alkyl group, $R_2$ and $R_3$ each represents a hydrogen atom, an alkyl group having from 1 to 10 carbon atoms, or an aryl group having from 6 to 10 carbon atoms, provided that $R_2$ and $R_3$ do not represent a hydrogen atom at the same time.

$R_1$ represents a hydrogen atom or an alkyl group, and preferably a hydrogen atom or an alkyl group having from 1 to 4 carbon atoms.

As the alkyl group having from 1 to 10 carbon atoms represented by $R_2$ and $R_3$, e.g., methyl, ethyl, n-propyl, n-butyl, isobutyl, t-butyl, n-hexyl, n-heptyl, n-octyl and 2-ethylhexyl are exemplified. As the aryl group having from 6 to 10 carbon atoms, e.g., phenyl, 1-naphthyl and 2-naphthyl are exemplified. The alkyl group and aryl group may be substituted and, e.g., a hydroxyl group, an alkoxyl group, a halogen atom, a phenyl group, a dimethylamino group, an ethylene oxide group, a vinyl group, and an o-carboxybenzoyloxy group are exemplified as the substituents. However, $R_2$ and $R_3$ do not represent a hydrogen atom at the same time.

The specific examples of (meth)acrylamide derivatives are shown below, but the present invention is not limited thereto.

(c-1) N-tert-Butylacrylamide
(c-2) N-(n-Butoxymethyl)acrylamide
(c-3) N-tert-Butylmethacrylamide
(c-4) N-(1,1-Dimethyl-3-oxobutyl)acrylamide
(c-5) N,N-Dimethylmethacrylamide
(c-6) N,N-Dimethylacrylamide
(c-7) N-Isopropylacrylamide
(c-8) N-Methylmethacrylamide
(c-9) N-Phenylmethacrylamide
(c-10) N-[3-(Dimethylamino)propyl]acrylamide In the copolymer component (2), (meth)acrylamide derivative may be used alone or may be used in combination of two or more.

The content of (meth) acrylamide derivatives in the resin (A) is preferably from 0 to 95 mol %, more preferably from 5 to 90 mol %, and still more preferably from 20 to 80 mol %.

The styrene derivatives which constitute the copolymer component (2) of the present invention are not especially restricted so long as they are derivatives of styrene, however, a styrene derivative represented by formula (b) is preferably used:

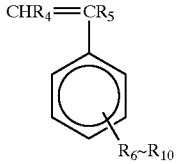

wherein $R_4$, $R_5$ and $R_6$ to $R_{10}$ each represents a hydrogen atom or a substituent.

The substituents represented by $R_4$, $R_5$ and $R_6$ to $R_{10}$ are not particularly restricted and, e.g., an alkyl group, an aryl group, a hydroxyl group, a carboxyl group and a halogen atom are exemplified as the substituents. $R_4$, $R_5$ and $R_6$ to $R_{10}$ may be bonded to form a ring.

The specific examples of styrene derivatives are shown below, but the present invention is not limited thereto.

(b-1) 4-Bromostyrene
(b-2) β-Bromostyrene
(b-3) 4-Chloro-α-methylstyrene
(b-4) 3-Chlorostyrene
(b-5) 4-Chlorostyrene
(b-6) 2,6-Dichlorostyrene
(b-7) 2-Fluorostyrene
(b-8) 3-Fluorostyrene
(b-9) 4-Fluorostyrene
(b-10) Methylstyrene
(b-11) Vinyltoluene
(b-12) trans-β-Methylstyrene

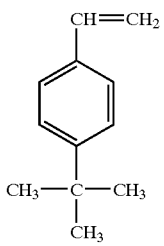
b-13

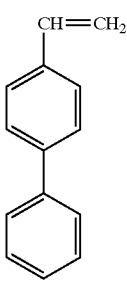
b-14

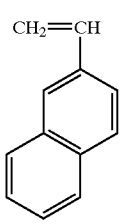
b-15

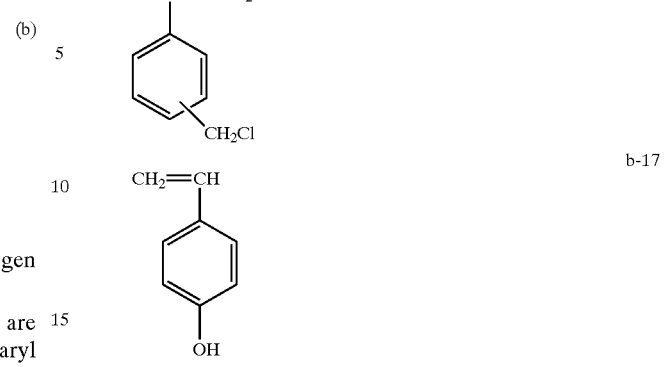

In addition to the above, styrene, vinylbenzoic acid, methyl vinylbenzoate, hydroxystyrene, sodium p-styrenesulfonate, potassium p-styrenesulfinate, p-aminomethylstyrene and 1,4-divinylbenzene are exemplified. The above-described styrene derivatives may be used alone or two or in combination.

The content of styrene derivatives in the resin (A) is preferably from 0 to 95 mol %, more preferably from 5 to 90 mol %, and still more preferably from 20 to 80 mol %.

The resin (A) containing the copolymer components (1) and (2) shows preferred characteristics in itself, e.g., preferred development latitude, however, further improvements of other various characteristics or modifications can be obtained by the copolymerization with the third copolymer component. For example, other various characteristics include chemical resistance, press life, sensitivity, developability, etc. As the third copolymer components, acrylic ester, acrylonitrile, maleimide, vinyl acetate, N-vinylpyrrolidone, etc., are exemplified.

The weight average molecular weight of the resin (A) in the present invention is preferably from 5,000 to 200,000, more preferably from 10,000 to 120,000, still more preferably from 10,000 to 100,000, particularly preferably from 20,000 to 80,000, and most preferably from 30,000 to 60,000. When the molecular weight is too small, sufficient coating cannot be obtained, and when it is too great, the developability is liable to be deteriorated.

Conventionally known graft copolymerization methods, block copolymerization methods and random copolymerization methods can be used for copolymerization.

When the infrared-sensitive photosensitive composition of the present invention is used in a photosensitive layer of a lithographic printing plate, the resin (A) is preferably contained in an amount of from 1 to 50 wt % based on the total solid contents, more preferably from 1 to 40 wt %, still more preferably from 2 to 30 wt %, and most preferably from 5 to 20 wt %. When the content of the resin (A) is more than 50 wt %, the press life disadvantageously lowers at burning.

In the next place, the novolak resin (B) according to the present invention is described in detail below.

As the novolak resin, novolak resins, e.g., phenol-formaldehyde resins, m-cresol-formaldehyde resins, p-cresol-formaldehyde resins, mixed m-/p-cresol-formaldehyde resins, and mixed phenol-cresol (any of m-, p-, or m-/p-mixtures maybe used)-formaldehyde resins, and pyrogallol-acetone resins are preferably used in the present invention.

As disclosed in U.S. Pat. No. 4,123,279, condensation polymerization products of phenol and formaldehyde having an alkyl group having from 3 to 8 carbon atoms as a substituent, e.g., t-butylphenol-formaldehyde resins and octylphenol-formaldehyde resins are exemplified. The weight average molecular weight of such condensation polymerization products is preferably 500 or more, more preferably from 1, 000 to 700,000, and the number average molecular weight is preferably 500 or more, and more preferably from 750 to 650,000. The dispersion degree (weight average molecular weight/number average molecular weight) of the condensation polymerization products is preferably from 1.1 to 10.

When the infrared-sensitive photosensitive composition according to the present invention is used in a photosensitive layer of a lithographic printing plate, it is preferred that a novolak resin for use in the present invention should be used in proportion of from 10 to 95 wt % of the total solid contents of the photosensitive layer, and more preferably from 20 to 90 wt %. When the content of the novolak resin is less than 10 wt %, the effect of improving press life by burning treatment is low, and the photosensitive composition is unusable in some cases.

It is preferred to further add resins insoluble in water and soluble in an alkali aqueous solution (hereinafter merely referred to as alkali-soluble resins) besides novolak resins to the infrared-sensitive photosensitive composition in the present invention.

The examples of alkali-soluble resins include, e.g., polyhydroxystyrene, hydroxystyrene polyhalide, N-(4-hydroxyphenyl)methacrylamide copolymers, hydroquinone monomethacrylate copolymers, the sulfonylimide polymers disclosed in Japanese Patent Laid-Open No. 28244/1995, and the carboxyl group-containing polymers disclosed in Japanese Patent Laid-Open No. 36184/1995. In addition, various alkali-soluble high molecular weight compounds such as the acrylate resins having a phenolic hydroxyl group as disclosed in Japanese Patent Laid-Open No. 34711/1976, the acrylate resins having a sulfonamido group as disclosed in Japanese Patent Laid-Open No. 866/1990, and urethane resins can also be used.

These alkali-soluble high molecular weight compounds preferably have a weight average molecular weight of from 500 to 20,000 and a number average molecular weight of from 200 to 60,000. These alkali-soluble high molecular weight compounds can be used alone or in combination of two or more, and they are used in an amount of 80 wt % or less based on the entire composition.

Further, for the purpose of improving the sensitizing property of an image, it is preferred to use, as disclosed in U.S. Pat. No. 4,123,279, condensation products of phenol and formaldehyde having an alkyl group having from 3 to 8 carbon atoms as a substituent, e.g., t-butylphenol-formaldehyde resins and octylphenol-formaldehyde resins.

These alkali-soluble resins are generally used in an amount of 90 wt % or less based on the total weight of the composition. High molecular weight compounds having any functional group of phenolic hydroxyl group, a sulfonamido group and an active imido group in the molecule are particularly preferably used in the present invention as the other alkali-soluble resins.

A light-to-heat converting agent (C) (hereinafter also referred to as "component (C)") is added to the infrared-sensitive photosensitive composition in the present invention.

The light-to-heat converting agents (C) for use in the present invention are not particularly restricted so long as they are substances which absorb infrared rays and generate heat. In addition to infrared-absorbing dyes, various pigments known as infrared-absorbing pigments and infrared-absorbing dyes other than those exemplified can be used.

As such pigments, commercially available pigments and pigments described in Color Index (C.I.) Handbook, *Saishin Ganryo Binran* (*Handbook of the Latest Pigments*), compiled by Nippon Ganryo Gijutsu Kyokai (1977), *Saishin Ganryo Oyo Gijutsu* (*Applied Techniques of the Latest Pigments*), CMC Publishing Co. (1986), and *Insatsu Ink Gijutsu* (*Printing Ink Techniques*), CMC Publishing Co. (1984) can be used.

As the kinds of pigments which can be used in the present invention, black pigments, yellow pigments, orange pigments, brown pigments, red pigments, purple pigments, blue pigments, green pigments, fluorescent pigments, metal powder pigments, and polymer-conjugation dyes can be exemplified. Specifically, insoluble azo pigments, azo lake pigments, condensation azo pigments, chelate azo pigments, phthalocyanine-series pigments, anthraquinone-series pigments, perylene-series pigments, perinone-series pigments, thioindigo-series pigments, quinacridone-series pigments, dioxazine-series pigments, isoindolinone-series pigments, quinophthalone-series pigments, dyeing lake pigments, azine pigments, nitroso pigments, nitro pigments, natural pigments, fluorescent pigments, inorganic pigments and carbon black can be used.

These pigments may be used without surface treatment or may be surface-treated. As the methods of surface treatments, a method of surface-coating with a resin and a wax, a method of adhering a surfactant, and a method of conjugating a reactive substance (e.g., a silane coupling agent, an epoxy compound and polyisocyanate) on the surface of a pigment can be exemplified. These surface treatment methods are described in *Kinzoku Sekken no Seishitsu to Oyo* (*Natures and Applications of Metal Soaps*), Saiwai Shobo Co., *Insatsu Ink Gijutsu* (*Printing Ink Techniques*), CMC Publishing Co. (1984), and *Saishin Ganryo Oyo Gijutsu* (*Applied Techniques of the Latest Pigments*), CMC Publishing Co. (1986).

The pigments have a particle size of preferably from 0.01 to 10 $\mu$m, more preferably from 0.05 to 1 $\mu$m, and particularly preferably from 0.1 to 1 $\mu$m. When the particle size of these pigments is less than 0.01 $\mu$m, it is difficult to obtain the stability of dispersion in the coating solution of a recording layer, and when the particle size exceeds 10 $\mu$m, a uniform recording layer cannot be obtained.

Well-known dispersion methods used in the manufacture of inks and toners can be used as the dispersing methods of pigments. The examples of dispersing apparatus include an ultrasonic disperser, a sand mill, an attritor, a pearl mill, a super-mill, a ball mill, an impeller, a disperser, a KD mill, a colloid mill, a dynatron, a three-roll mill, and a pressure kneader, and details of the dispersing apparatus are described in detail in *Saishin Ganryo Oyo Gijutsu* (*Applied Techniques of the Latest Pigments*), CMC Publishing Co. (1986).

As dyes for this purpose, commercially available dyes and well-known dyes described, e.g., in *Senryo Binran* (*Dye Handbook*), compiled by Yuki Gosei Kagaku Kyokai (1970) can be used. The specific examples of these dyes include azo dyes, metal complex azo dyes, pyrazolone azo dyes, anthraquinone dyes, phthalocyanine dyes, carbonium dyes, quinoneimine dyes, methine dyes and cyanine dyes.

Of the above-described pigments and dyes, those which absorb infrared rays or near infrared rays are particularly preferably used in the point that they are suitable for use in lasers which emit infrared rays or near infrared rays.

As such pigments which absorb infrared rays or near infrared rays, carbon blacks are preferably used. Further, as dyes which absorb infrared rays or near infrared rays, e.g., the cyanine dyes disclosed in Japanese Patent Laid-Open Nos. 125246/1983, 84356/1984, 202829/1984 and 78787/1985, the methine dyes disclosed in Japanese Patent Laid-Open Nos. 173696/1983, 181690/1983 and 194595/1983, the naphthoquinone dyes disclosed in Japanese Patent Laid-Open Nos. 112793/1983, 224793/1983, 48187/1984, 73996/1984, 52940/1985 and 63744/1985, the squarylium dyes disclosed in Japanese Patent Laid-Open No. 112792/1983, and the cyanine dyes disclosed in British Patent 434,875 can be exemplified.

Further, the near infrared-absorbing sensitizing dyes disclosed in U.S. Pat. No. 5,156,938 are also preferably used. In addition, the substituted arylbenzo(thio)pyrylium salts disclosed in U.S. Pat. No. 3,881,924, the trimethine thiapyrylium salts disclosed in Japanese Patent Laid-Open No. 142645/1982 (corresponding to U.S. Pat. No. 4,327,169), the pyrylium series compounds disclosed in Japanese Patent Laid-Open Nos. 181051/1983, 220143/1983, 41363/1984, 84248/1984, 84249/1984, 146063/1984 and 146061/1984, the cyanine dyes disclosed in Japanese Patent Laid-Open No. 216146/1984, the pentamethine thiopyrylium salts disclosed in U.S. Pat. No. 4,283,475, the pyrylium compounds disclosed in Japanese Patent Publication Nos. 13514/1993 and 19702/1993 are particularly preferably used, and as commercially available products, Epolight III-178, Epolight III-130, and Epolight III-125 (manufactured by Epoline) are particularly preferably used.

As other examples of particularly preferred dyes, the near infrared-absorbing dyes disclosed in U.S. Pat. No. 4,756,993 as formulae (I) and (II) can be exemplified.

These pigments or dyes are used in an amount of from 0.01 to 50 wt %, preferably from 0.1 to 10 wt %, based on the total solid contents of the material, and in the case of dyes, particularly preferably the amount of from 0.5 to 10 wt %, and in the case of pigments, particularly preferably the amount of from 3.1 to 10 wt %, can be added to the composition.

When the addition amount of pigments or dyes is less than 0.01 wt %, the sensitivity lowers, and when it exceeds 50 wt %, the uniformity of the image-forming layer is lost and the durability of the image-forming layer is deteriorated. These dyes or pigments may be added in the same layer with other components, alternatively, other layer can be provided and they may be added thereto.

Other components which can be used in manufacturing a photosensitive composition for the composition of the image-forming layer of the present invention are described below.

Cyclic acid anhydrides, phenols and organic acids for increasing sensitivity can be further added to a photosensitive composition, if necessary. Further, printing out agents for obtaining a visible image immediately after exposure, dyes as coloring agents of an image, and other fillers can be added to a photosensitive composition.

The examples of cyclic acid anhydrides include, as disclosed in U.S. Pat. No. 4,115,128, phthalic anhydride, tetrahydrophthalic anhydride, hexahydrophthalic anhydride, 3,6-endoxy-Δ4-tetrahydrophthalic anhydride, tetrachlorophthalic anhydride, maleic anhydride, chloromaleic anhydride, α-phenylmaleic anhydride, succinic anhydride and pyromellitic anhydride. The examples of phenols include bisphenol A, p-nitrophenol, p-ethoxyphenol, 2,3,4-trihydroxybenzophenone, 4-hydroxybenzophenone, 2,4,4'-trihydroxybenzophenone, 4,4',4"-trihydroxytriphenylmethane, and 4,4',3",4"-tetrahydroxy-3,5,3',5'-tetramethyltriphenylmethane.

The examples of organic acids include, as disclosed in Japanese Patent Laid-Open Nos. 88942/1985 and 96755/1990, sulfonicacids, sulfinicacids, alkylsulfuricacids, phosphonic acids, phosphinic acids, phosphoric esters and carboxylic acids, specifically, p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 1,4-cyclohexene-2,2-dicarboxylic acid, erucic acid, lauric acid, n-undecanoic acid and ascorbic acid can be exemplified.

The content of cyclic acid anhydrides, phenols and organic acids in a photosensitive composition is preferably from 0.05 to 15 wt %, and more preferably from 0.1 to 5 wt %.

As printing out agents for obtaining a visible image immediately after exposure, a photosensitive compound which releases an acid upon exposure and an organic dye which forms a salt with an acid to change a color tone can be used in combination.

The examples of photosensitive compounds releasing an acid upon exposure include, e.g., o-naphthoquinonediazide-4-sulfonic acid halogenide disclosed in Japanese Patent Laid-Open No. 36209/1975;
trihalomethyl-2-pyrone and trihalomethyl-s-triazine disclosed in Japanese Patent Laid-Open No. 36223/1978;
various
o-quinonediazide compounds disclosed in Japanese Patent Laid-Open No. 62444/1980;
2-trihalomethyl-5-aryl-1,3,4-oxadiazole compounds disclosed in Japanese Patent Laid-Open No. 77742/1980; and diazonium salts.

These compounds can be used alone or as mixture, and the addition amount is preferably from 0.3 to 15 wt % based on the total weight of the composition.

In the photosensitive composition in the present invention, at least one kind of an organic dye which changes its color tone by the interaction with the photolysis product of a compound which generates an acidic substance by photolysis is used.

As such organic dyes, diphenylmethane series, triarylmethane series, thiazine series, oxazine series, phenazine series, xanthene series, anthraquinone series, iminonaphthoquinone series and azomethine series dyes can be used.

The specific examples of such dyes include Brilliant Green, Eosine, EthylViolet, ErythrosineB, MethylGreen, Crystal Violet, Basic Fuchsine, Phenolphthalein, 1,3-diphenyltriazine, Alizarin Red S, Thymolphthalein, Methyl Violet 2B, Quinaldine Red, Rose Bengale, Thymolsulfophthalein, Xylenol Blue, Methyl Orange, Orange IV, Diphenylthiocarbazone, 2,7-dichlorofluorescein, Paramethyl Red, Congo Red, Benzopurpurine 4B, α-Naphthyl Red, Nile Blue-2B, Nile Blue-A, Phenacetalin, Methyl Violet, Malachite Green, Parafuchsine, Oil Blue #603 (a product of Orient Kagaku Kogyo Co., Ltd.), Oil Pink #312 (a product of Orient Kagaku Kogyo Co., Ltd.), Oil Red 5B (a product of Orient Kagaku Kogyo Co., Ltd.), Oil Scarlet #308 (a product of Orient Kagaku Kogyo Co., Ltd.), Oil Red OG (a product of Orient Kagaku Kogyo Co., Ltd.), Oil Red RR (a product of Orient Kagaku Kogyo Co., Ltd.), Oil Green #502 (a product of Orient Kagaku Kogyo Co., Ltd.), Spiron Red BEH Special (a product of Hodogaya Kagaku Kogyo Co., Ltd.), Victoria Pure Blue BOH (a product of Hodogaya Kagaku Kogyo Co., Ltd.), Patent Pure Blue (a product of Sumitomo Mikuni Kagaku Kogyo Co., Ltd.), Sudan Blue II (a product of BASF Co., Ltd.), m-cresol purple, Cresol Red, Rhodamine B, Rhodamine 6G, First Acid Violet R, Sulfo Rhodamine B, Auramine, 4-p-diethylaminophenyliminonaphthoquinone, 2-carboxyanilino-4-p-diethylaminophenyliminonaphthoquinone, 2-carbostearylamino-4-p-dihydroxyethylaminophenyliminonaphthoquinone, p-methoxybenzoyl-p'-diethylamino-o'-methylphenyliminoacetanilide, cyano-p-diethylaminophenyliminoacetanilide, 1-phenyl-3-methyl-4-p-diethylaminophenylimino-5-pyrazolone, and 1-β-naphthyl-4-p-diethylaminophenylimino-5-pyrazolone.

Particularly preferred organic dyes are triarylmethane series dyes. Of triarylmethane series dyes, those having a sulfonic acid compound as the counter anion disclosed in Japanese Patent Laid-Open No. 2934471/1987 and Japanese Patent No. 2969021 are particularly useful.

These dyes can be used alone or as mixture. The addition amount of these dyes is preferably from 0.3 to 15 wt % based on the total weight of the photosensitive composition. These dyes can be used in combination with other dyes and pigments, if necessary, and the amount at that time is 70 wt % or less based on the total weight of the dyes and pigments, preferably 50 wt % or less.

In addition, various additives can be added to the composition of the present invention according to purposes, e.g., various resins having a hydrophobic group for improving the ink-receiving property of the image, e.g., octylphenol-formaldehyde resins, t-butylphenol-formaldehyde resins, t-butylphenol-benzaldehyde resins, rosin-modified novolak resins, and o-naphthoquinonediazidosulfonic esters of these modified novolak resins; and plasticizers for improving the flexibility of a coating film, e.g., dibutyl phthalate, dioctyl phthalate, butyl glycolate, tricresyl phosphate and dioctyl adipate.

The addition amount of these additives is preferably from 0.01 to 30 wt % based on the total weight of the composition.

Moreover, well-known resins can be added to the composition for further improving the abrasion resistance of a film. For example, polyvinyl acetal resins, polyurethane resins, epoxy resins, vinyl chloride resins, nylons, polyester resins and acrylate resins can be used for such a purpose. The resins can be used alone or in combination.

The addition amount is preferably from 2 to 40 wt % based on the total weight of the composition.

Surfactants can be added to the photosensitive composition of the present invention for widening development latitude, e.g., nonionic surfactants as disclosed in Japanese Patent Laid-Open Nos. 251740/1987 and 68355/1992, and ampholytic surfactants as disclosed in Japanese Patent Laid-Open Nos. 121044/1984 and 13149/1992 can be added. The specific examples of nonionic surfactants include sorbitan tristearate, sorbitan monopalmitate, sorbitan trioleate, stearic acid monoglyceride, polyoxyethylene sorbitan monooleate and polyoxyethylenenonylphenyl ether, and the specific examples of ampholytic surfactants include alkyldi(aminoethyl)glycine, alkylpolyaminoethylglycine hydrochloride, Amorgen K (trade name, a product of Daiichi Kogyo Seiyaku Co., Ltd., N-tetradecyl-N,N-betaine type), 2-alkyl-N-carboxyethyl-N-hydroxyethylimidazolinium betaine, and Rebon 15 (trade name, a product of Sanyo Kasei Co., Ltd., alkylimidazoline series).

The proportion of the above nonionic and ampholytic surfactants in the photosensitive composition is preferably from 0.05 to 15 wt %, and more preferably from 0.1 to 5 wt %.

Improvement of Coating Surface Quality:

Surfactants, e.g., fluorine surfactants as disclosed in Japanese Patent Laid-Open No. 170950/1987 can be added to the photosensitive composition in the present invention for improving the coating surface quality.

They are used in an amount of preferably from 0.001 to 1.0 wt %, and more preferably from 0.005 to 0.5 wt %, based on the total weight of the photosensitive composition.

Yellow dyes can be added to the photosensitive composition in the present invention, e.g., yellow dyes the light absorption at 417 nm of which is 70% or more of that at 436 nm can be preferably used.

When a photosensitive material for a lithographic printing plate is prepared from the photosensitive resin composition of the present invention, the photosensitive resin composition is provided as an image-forming layer on an appropriate support in the first place. The photosensitive resin composition of the present invention is dissolved or dispersed in a single or mixed organic solvents described below, coated on a support and dried.

Any well-known organic solvent can be used as the solvent, but solvents having a boiling point of from 40° C. to 200° C., particularly preferably from 60° C. to 160° C., are preferably used from the viewpoint of advantageousness at drying.

The examples of the organic solvents include alcohols, e.g., methyl alcohol, ethyl alcohol, n-propyl alcohol, isopropyl alcohol, n-butyl alcohol, isobutyl alcohol, and diacetone alcohol; ketones, e.g., acetone, methyl ethyl ketone, methyl propyl ketone, methyl butyl ketone, methyl amyl ketone, methyl hexyl ketone, diethyl ketone, diisobutyl ketone, cyclohexanone, methylcyclohexanone and acetylacetone; hydrocarbons, e.g., benzene, toluene, xylene, cyclohexane and methoxybenzene; acetic esters, e.g., ethyl acetate, n-propyl acetate, isopropyl acetate, n-butyl acetate, isobutyl acetate, ethylbutyl acetate and hexyl acetate; halides, e.g., methylene dichloride, ethylene dichloride and monochlorobenzene; ethers, e.g., isopropyl ether, n-butyl ether, dioxane, dimethyl dioxane and tetrahydrofuran; polyhydric alcohols and derivatives thereof, e.g., ethylene glycol, methyl cellosolve, methyl cellosolve acetate, ethyl cellosolve, diethyl cellosolve, cellosolve acetate, butyl cellosolve, butyl cellosolve acetate, methoxymethoxyethanol, diethylene glycol monomethyl ether, diethylene glycol dimethyl ether, diethylene glycol methylethyl ether, diethylene glycol diethyl ether, propylene glycol, propylene glycol monomethyl ether, propylene glycol monomethyl ether acetate, propylene glycol monoethyl ether, propylene glycol monoethyl ether acetate, propylene glycol monobutyl ether and 3-methyl-3-methoxybutanol; and specific solvents, e.g., dimethyl sulfoxide and N,N-dimethylformamide. These organic solvents are preferably used alone or as mixture.

The concentration of the solid content in the composition for coating is preferably from 2 to 50 wt %.

Various coating methods are used in the present invention, e.g., roll coating, dip coating, air knife coating, gravure coating, gravure offset coating, hopper coating, blade coating, wire doctor coating, and spray coating. The coating weight after dry is preferably from 0.3 to 4.0 g/m$^2$.

As the coating amount reduces, the exposure amount for obtaining images can be saved but the film strength lowers. As the coating amount increases, the exposure amount increases but the photosensitive film comes to be strong, as a result, when the plate is used as a printing plate, a printing plate high in printable number of sheets (having high press life) can be obtained.

The photosensitive composition coated on a support is generally dried by hot air. Heating temperature is from 30° C. to 200° C., and particularly preferably from 40° C. to 140° C. Drying temperature may be maintained constant during drying or may be increased stepwise. The removal of moisture of drying air sometimes brings about good results. It is preferred to supply hot drying air to the coated surface at a rate of from 0.1 to 30 m/sec, particularly preferably from 0.5 to 20 m/sec.

Matting Layer:

It is preferred to provide a matting layer on the thus-provided photosensitive layer surface for shortening the vacuuming time at contact exposure using a vacuum printing frame and preventing halation. Specifically, the coating methods of a matting layer as disclosed in Japanese Patent Laid-Open No. 125805/1975, Japanese Patent Publication Nos. 6582/1982 and 28986/1986, and the method of fusing solid particles by heat as disclosed in Japanese Patent Publication No. 62337/1987 are used.

A support for use in a photosensitive lithographic printing plate is a plate having dimensional stability and supports so far been used as supports of lithographic printing plates can be preferably used. The examples of such supports include paper; paper laminated with plastics (e.g., polyethylene, polypropylene and polystyrene); metal plates, e.g., aluminum (including aluminum alloys), zinc, iron and copper; plastic films, e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal; and paper or plastic films laminated or deposited with metals as above; and an aluminum plate is particularly preferably used. Aluminum plates include a pure aluminum plate and an aluminum alloy plate. Various aluminum alloys can be used, e.g., alloys of aluminum with metals such as silicon, copper, manganese, magnesium, chromium, zinc, lead, bismuth or nickel. These compositions include a negligible amount of impurities in addition to a certain amount of iron and titanium.

A support is subjected to surface treatment, if necessary. For example, in the case of a photosensitive lithographic printing plate, the surface of the support is subjected to hydrophilization treatment. In the case of a metal support, in particular, a support having an aluminum surface, it is preferred to perform surface treatment such as graining treatment, immersion treatment in an aqueous solution of sodium silicate, potassium fluorozirconate or phosphate, or anodic oxidation treatment. Further, as disclosed in U.S. Pat. No. 2,714,066, an aluminum plate subjected to immersion treatment in an aqueous solution of sodium silicate after graining treatment, or an aluminum plate surface treated by immersion in an aqueous solution of alkali metal silicate after anodic oxidation treatment as disclosed in U.S. Pat. No. 3,181,461 are also preferably used.

Anodic oxidation treatment is carried out by turning on electricity with the aluminum plate as the anode in an electrolytic solution comprising alone or combination of two or more of an aqueous solution or nonaqueous solution of an inorganic acid such as phosphoric acid, chromic acid, sulfuric acid, boric acid, etc., or an organic acid such as oxalic acid, sulfamic acid, etc., or salts of these acids.

Electrodeposition of silicate as disclosed in U.S. Pat. No. 3,658,662 is also useful. These hydrophilization treatments are performed for preventing harmful reactions of a support with a photosensitive composition provided on the support, or for improving the adhesion of the support with the photosensitive layer, in addition to making the support surface hydrophilic. Prior to surface roughening of an aluminum plate by graining, if desired, the surface of the aluminum plate may be subjected to pre-treatment to remove a rolling oil from the plate surface or to expose a clean aluminum plate surface.

In general, solvents such as trichlene and surfactants are used in degreasing treatment for removing a rolling oil, and alkali etching agents, e.g., sodium hydroxide and potassium hydroxide, are widely used for exposing clean surface.

As surface graining methods, any of mechanical, chemical and electrochemical methods can be used. Mechanical methods include a ball abrading method, a blasting method, and a brushing method in which water dispersion slurry of an abrasive such as pumice and the like is rubbed on the surface of a plate with a nylon brush, as the chemical method, a method of immersing a plate in a saturated aqueous solution of an aluminum salt of a mineral acid as disclosed in Japanese Patent Laid-Open No. 31187/1979 is preferred, and as the electrochemical method, a method of performing alternating current electrolysis in an acid electrolytic solution of hydrochloric acid, nitric acid or combination of these acids is preferably used. Of these surface roughening methods, a method of combining mechanical surface roughening with electrochemical surface roughening as disclosed in Japanese Patent Laid-Open No. 137993/1980 is preferred because strong adhesion of a sensitized image to a support can be achieved. Surface graining as described above is preferably performed so as to reach the central line surface roughness (Ra) of the surface of an aluminum plate of from 0.3 to 1.0 μm. The aluminum plate thus surface-treated is subjected to washing and chemical etching, if necessary.

An etching solution is generally selected from among aqueous solutions of base or acid for dissolving aluminum. In this case, an etching solution is selected so that a film different from the aluminum derived from the ingredient of the etching solution is not formed on the etched surface. The examples of preferred etching agents include, as basic substances, sodium hydroxide, potassium hydroxide, trisodium phosphate, disodium phosphate, tripotassium phosphate and dipotassium phosphate; and as acid substances, sulfuric acid, persulfuric acid, phosphoric acid, hydrochloric acid and salts thereof. Salts of metals having a lower tendency to ionization than aluminum, e.g., zinc, chromium, cobalt, nickel and copper are not preferred because an unnecessary film is formed on the etched surface. The concentration and temperature of these etching agents are most preferably set up so that the solution rate of the aluminum or alloy to be used comes to the range of from 0.3 to 40 $g/m^2$ per immersion time of one minute, but lower than that or higher than that may also be used.

Etching is performed by immersing an aluminum plate in an etching solution or coating the etching solution on the aluminum plate, and it is preferred to perform etching so that the etching amount becomes from 0.5 to 10 $g/m^2$. It is preferred to use a basic aqueous solution, since the etching velocity is fast. In this case, since smutting is generated, desmutting treatment is generally performed. As acids for use in desmutting treatment, nitric acid, sulfuric acid, phosphoric acid, chromic acid, hydrofluoric acid and borofluoric acid are used. The etching-treated aluminum plate is washed with water and anodically oxidized, if necessary. Anodic oxidation can be effected by conventionally used methods in this field.

Specifically, by applying a direct or alternating electric current to an aluminum plate in an aqueous solution or nonaqueous solution comprising single or combination of two or more of sulfuric acid, phosphoric acid, chromic acid, oxalic acid, sulfamic acid or benzenesulfonic acid, an anodic oxide film can be formed on the surface of the aluminum support.

Treatment conditions of anodic oxidation cannot be determined unconditionally as conditions fluctuate variously depending upon the electrolytic solution to be used, but generally it is preferred that the concentration of an electrolytic solution is from 1 to 80 wt %, the temperature is from 5 to 70° C., the electric current density is from 0.5 to 60 ampere/dm$^2$, the voltage is from 1 to 100 V, and the electrolytic time is from 30 seconds to 50 minutes. Of these anodic oxidation treatments, the method of performing anodic oxidation in a sulfuric acid at high electric current density as disclosed in British Patent 1,412,768, and the method of performing anodic oxidation with phosphoric acid as the electrolytic bath disclosed in U.S. Pat. No. 3,511,661 are particularly preferred. The thus-surface roughened and further anodically oxidized aluminum plate may be subjected to hydrophilizing treatment according to necessity. As the preferred examples thereof, there are methods of treatment with alkali metal silicate, e.g., an aqueous solution of sodium silicate as disclosed in U.S. Pat. Nos. 2,714,066 and 3,181,461, treatment with potassium fluorozirconate as disclosed in Japanese Patent Publication No. 22063/1961, and treatment with polyvinylsulfonic acid as disclosed in U.S. Pat. No. 4,153,461.

Organic Subbing Layer:

It is preferred that the photosensitive lithographic printing plate according to the present invention is provided with an organic subbing layer before coating a photosensitive layer in view of the reduction of the photosensitive layer remaining on the non-image area. The organic compounds which are used in such a subbing layer are selected from carboxymethyl cellulose, dextrin, gum arabic, organic phosphonic acid, e.g., phosphonic acids having an amino group, such as 2-aminoethylphosphonic acid, phenylphosphonic acid which may have a substituent, naphthylphosphonic acid, alkylphosphonic acid, glycerophosphonic acid, methylenediphosphonic acid, and ethylenediphosphonic acid, organic phosphoric acid, e.g., phenylphosphoric acid which may have a substituent, naphthyl-phosphoric acid, alkylphosphoric acid, and glycerophosphoric acid, organic phosphinic acid, e.g., phenylphosphinic acid which may have a substituent, naphthylphosphinic acid, alkyl-phosphinic acid, and glycerophosphinic acid, amino acids, e.g., glycine and β-alanine, and hydrochloride of amine having a hydroxyl group such as hydrochloride of triethanolamine. These compounds may be used as mixture of two or more.

It is also preferred that an organic subbing layer contains a compound having an onium group. Compounds having an onium group are disclosed in Japanese Patent Laid-Open Nos. 10292/2000 and 108538/2000.

Further, at least one compound selected from among high molecular weight compounds having the structural unit represented by poly(p-vinylbenzoic acid) in the molecule can be used in the present invention. More specifically, copolymers of p-vinylbenzoic acid and vinylbenzyl triethylammonium salt, and copolymers of p-vinylbenzoic acid and vinylbenzyl trimethylammonium chloride are exemplified.

An organic subbing layer can be provided by the following methods, that is, a solution obtained by dissolving the above-described organic compounds in water or a single or mixed organic solvent, e.g., methanol, ethanol or methyl ethyl ketone, is coated on an aluminum plate and dried to provide an organic subbing layer. Alternatively, an aluminum plate is immersed in a solution obtained by dissolving the above-described organic compounds in water or a single or mixed organic solvent such as methanol, ethanol or methyl ethyl ketone, thereby the organic compounds are adsorbed onto the aluminum plate, the plate is then washed with water or the like, and dried to provide an organic subbing layer. According to the former method, the solution containing the above organic compounds in concentration of from 0.005 to 10 wt % can be coated by various means. For example, any method of bar coating, rotary coating, spray coating and curtain coating may be used. In the latter method, the concentration of the solution is from 0.01 to 20 wt %, preferably from 0.05 to 5 wt %, the immersion temperature is from 20 to 90° C., preferably from 25 to 50° C., and the immersion time is from 0.1 second to 20 minutes, and preferably from 2 seconds to 1 minute.

The pH of the solution used in forming an organic subbing layer is adjusted to 1 to 12 with basic substance, e.g., ammonia, triethylamine or potassium hydroxide, or acidic substance, e.g., hydrochloric acid or phosphoric acid. A yellow dye can be added to the solution for improving tone reproducibility of the photosensitive lithographic printing plate. Further, a compound represented by formula (a) can be added to this solution:

$$(HO)_x-R_5-(COOH)_y \qquad (a)$$

wherein $R_5$ represents an arylene group having 14 or less carbon atoms, which may have a substituent; and x and y each represents an integer of from 1 to 3. The specific examples of the compounds represented by formula (a) include 3-hydroxybenzoic acid, 4-hydroxybenzoic acid, salicylic acid, 1-hydroxy-2-naphthoic acid, 2-hydroxy-1-naphthoic acid, 2-hydroxy-3-naphthoic acid, 2,4-dihydroxybenzoic acid, and 10-hydroxy-9-anthracenecarboxylic acid. The dry coating weight of an organic subbing layer is generally from 1 to 100 mg/m$^2$, and preferably from 2 to 70 mg/m$^2$. If the coating weight is less than 2 mg/m$^2$, sufficient press life cannot be obtained, and when it is more than 100 mg/m$^2$, sufficient press life cannot be obtained, also.

Back Coating Layer:

A back coating layer is provided on the back surface of a support, if necessary. Coating layers comprising a metallic oxide obtained by hydrolyzing and polycondensing the organic high molecular weight compounds disclosed in Japanese Patent Laid-Open No. 45885/1993 and the organic or inorganic metallic compounds disclosed in Japanese Patent Laid-Open No. 35174/1994 are preferably used as such a back coating layer. Of these coating layers, alkoxyl compounds of silicon such as $Si(OCH_3)_4$, $Si(OC_2H_5)_4$, $Si(OC_3H_7)_4$ and $Si(OC_4H_9)_4$ are inexpensive and easily available, and coating layers of the metallic oxides obtained from these compounds are excellent in resistance against developing solutions and particularly preferred.

The thus-obtained lithographic printing plate is generally subjected to image exposure and development process. As the light sources of actinic rays used for image exposure, light sources having light emission wavelength at near infrared to infrared regions are preferred, and a solid state laser and a semiconductor laser are particularly preferably used.

Developing solutions containing (a) at least one kind of saccharide selected from non-reducing sugars, and (b) at least one kind of base, and having pH of from 9.0 to 13.5 are preferably used as the developing solution for a lithographic printing plate using the photosensitive composition of the present invention. This developing solution is described in detail below. In this specification, a developing solution means a developing initiator (a developing solution in a narrow sense) and a developing replenisher, unless otherwise indicated.

This developing solution preferably comprises at least one compound selected from non-reducing sugars and at least one base as the main components, and the pH of the solution is preferably within the range of from 9.0 to 13.5. Such non-reducing sugars are saccharides which do not have a free aldehyde group and a ketone group and do not show reducing property. The non-reducing sugars are classified to a trehalose type oligosaccharide in which reducing groups are bonded to each other, a glycoside in which reducing groups of saccharides and non-saccharides are bonded to each other, and a sugar alcohol obtained by reducing saccharides by hydrogenation, and all of these non-reducing sugars can be preferably used. Trehalose type oligosaccharides include succharose and trehalose, glycosides include alkyl glycoside, phenol glycoside, and mustard oil glycoside, and sugar alcohols include D- and L-arabitol, ribitol, xylitol, D- and L-sorbitol, D- and L-mannitol, D- and L-iditol, D- and L-talitol, dulicitol, and allodulcitol. In addition, maltitol obtained by hydrogenation of disaccharide and the reductant (reduced starch syrup) obtained by hydrogenation of oligosaccharide are preferably used. Particularly preferred non-reducing sugars of these are sugar alcohols and succharose. Above all, D-sorbitol, succharose and reduced starch syrup are preferred for the reasons that they show buffer action in an appropriate pH range and inexpensive.

Such non-reducing sugars can be used alone or in combination of two or more, and the proportion of non-reducing sugars in a developing solution is preferably from 0.1 to 30 wt %, and more preferably from 1 to 20 wt %.

When the concentration of non-reducing sugars is less than this range, sufficient buffer action cannot be obtained, and when the concentration is higher than this range, high concentration of developing solutions is difficult to obtain and the problem of the production cost increase arises. When reducing sugars are used in combination with bases, the developing solution discolors to brown with the lapse of time and pH gradually decreases, which results in the reduction of developing property.

Alkali agents so far been known can be used as a base to be used in combination with non-reducing sugars. The examples of such alkali agents include an inorganic alkali agent, e.g., sodium hydroxide, potassium hydroxide, lithium hydroxide, trisodium phosphate, tripotassium phosphate, triammonium phosphate, disodium phosphate, dipotassium phosphate, diammonium phosphate, sodium carbonate, potassium carbonate, ammonium carbonate, sodium hydrogencarbonate, potassium hydrogencarbonate, ammonium hydrogencarbonate, sodium borate, potassium borate, and ammonium borate. In addition to these inorganic alkali agents, organic alkali agents, e.g., monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine and pyridine are also used.

These alkali agents are used alone or in combination of two or more. Of these alkali agents, sodium hydroxide and potassium hydroxide are preferred for the reason that the pH adjustment in a wide pH range becomes possible by adjusting the amount of these alkali agents based on the non-reducing sugars. Further, trisodiumphosphate, tripotassiumphosphate, sodium carbonate and potassium carbonate are also preferred due to their own buffer action.

These alkali agents are added so as to reach the pH 9.0 to 13.5 of a developing solution, and the addition amount is determined depending upon the desired pH, the kind and the addition amount of the non-reducing sugars to be used. The more preferred pH range is from 10.0 to 13.2.

An alkaline buffering solution comprising weak acid and strong base other than saccharides can further be used in a developing solution in combination. Weak acids for use as such a buffering solution preferably have a dissociation constant (pKa) of from 10.0 to 13.2.

Such weak acids are selected from the weak acids described, e.g., in *Ionization Constants of Organic Acids in Aqueous Solution*, Pergamon Press Co. The examples of weak acids include alcohols, e.g., 2,2,3,3-tetrafluoropropanol-1 (pKa: 12.74), trifluoroethanol (pKa: 12.37), and trichloroethanol (pKa: 12.24); aldehydes, e.g., pyridine-2-aldehyde (pKa: 12.68), and pyridine-4-aldehyde (pKa: 12.05); compounds having a phenolic hydroxyl group, e.g., salicylic acid (pKa: 13.0), 3-hydroxy-2-naphthoic acid (pKa: 12.84), catechol (pKa: 12.6), gallic acid (pKa: 12.4), sulfosalicylic acid (pKa: 11.7), 3,4-dihydroxysulfonic acid (pKa: 12.2), 3,4-dihydroxybenzoic acid (pKa: 11.94), 1,2,4-trihydroxybenzene (pKa: 11.82), hydroquinone (pKa: 11.56), pyrogallol (pKa: 11.34), o-cresol (pKa: 10.33), resorcinol (pKa: 11.27), p-cresol (pKa: 10.27), and m-cresol (pKa: 10.09); oximes, e.g., 2-butanoneoxime (pKa: 12.45), acetoxime (pKa: 12.42), 1,2-cycloheptanedionedioxime (pKa: 12.3), 2-hydroxybenzaldehydeoxime (pKa: 12.10), dimethylglyoxime (pKa: 11.9), ethanediamidodioxime (pKa: 11.37), and acetophenoneoxime (pKa: 11.35); nucleic acid-relatingsubstances, e.g., adenosine (pKa: 12.56), inosine (pKa: 12.5), guanine (pKa: 12.3), cytosine (pKa: 12.2), hypoxanthine (pKa: 12.1), andxanthine (pKa: 11.9); in addition to the above, diethylaminomethylsulfonic acid (pKa: 12.32), 1-amino-3,3,3-trifluorobenzoic acid (pKa: 12.29), isopropylidenedisulfonic acid (pKa: 12.10), 1,1-ethylidenediphosphonic acid (pKa: 11.54), 1-hydroxy-1,1-ethylidenediphosphonic acid (pKa: 11.52), benzimidazole (pKa: 12.86), thiobenzamide (pKa: 12.8), picolinethioamide (pKa: 12.55), andbarbituricacid (pKa: 12.5).

Of these weak acids, sulfosalicylic acid and salicylic acid are preferred. Sodium hydroxide, ammonium hydroxide, potassium hydroxide, and lithium hydroxide are preferably used as bases to be used in combination with a weak acid. These alkali agents are used alone or in combination of two or more. These alkali agents are used by adjusting pH in a desired range by the concentration and combination.

Various surfactants and organic solvents can be added to a developing solution according to necessity with a view to accelerating development, dispersing developer scum, and increasing the affinity to ink of the image area of a printing plate. As preferred surfactants, anionic, cationic, nonionic, and ampholytic surfactants can be exemplified.

The preferred examples of surfactants include nonionic surfactants, e.g., polyoxyethylene alkyl ethers, polyoxyethylene alkylphenyl ethers, polyoxyethylene polystyrylphenyl ethers, polyoxyethylene polyoxypropylene alkyl ethers, glycerol fatty acid partial esters, sorbitan fatty acid partial esters, pentaerythritol fatty acid partial esters, propylene glycol monofatty acid esters, sucrose fatty acid partial esters, polyoxyethylene sorbitan fatty acid partial esters, polyoxyethylene sorbitol fatty acid partial esters, polyethylene glycol fatty acid esters, polyglycerol fatty acid partial esters, polyoxyethylenated castor oils, polyoxyethylene glycerol fatty acid partial esters, fatty acid diethanolamides, N,N-bis-2-hydroxyalkylamines, polyoxyethylenealkylamine, triethanolamine fatty acid ester, and trialkylamine oxide;

anionic surfactants, e.g., fatty acid salts, abietates, hydroxyalkanesulfonates, alkanesulfonates, dialkylsulfosuccinates, straight chain alkylbenzenesulfonates, branched chain alkylbenzenesulfonates, alkylnaphthalenesulfonates, alkylphenoxypolyoxyethylene-propylsulfonates, polyoxyethylene alkylsulfophenyl ethers, N-methyl-N-oleyltaurine sodium salt, N-alkylsulfosuccinic acid monoamido disodium salt, petroleum sulfonates, sulfated tallow, fatty acid alkyl ester sulfates, alkylsulfates, polyoxyethylene alkyl ether sulfates, fatty acid monoglyceride sulfates, polyoxyethylene alkylphenyl ether sulfates, polyoxyethylene styrylphenyl ether sulfates, alkylphosphates, polyoxyethylene alkyl ether phosphates, polyoxyethylene alkylphenyl ether phosphates, partially saponified products of styrene-maleic anhydride copolymers, partially saponified products of olefin-maleic anhydride copolymers, and condensation products of naphthalenesulfonate-formaldehyde; cationic surfactants, e.g., alkylamine salts, tertiary ammonium salts, e.g., tetrabutylammonium bromide, polyoxyethylenealkylamines and polyethylenepolyamine derivatives; ampholytic surfactants, e.g., carboxybetaines, aminocarboxylic acids, sulfobetaines, aminosulfates, and imidazolines. Of the above surfactants, "polyoxyethylene" can include polyoxyalkylene such as polyoxymethylene, polyoxypropylene and polyoxybutylene, and surfactants thereof are also included.

The more preferred surfactants are fluorine surfactants which contain a perfluoroalkyl group in the molecule. The examples of such fluorine surfactants include an anionic type, e.g., perfluoroalkylcarboxylate, perfluoroalkylsulfonates and perfluoroalkylphosphates; an ampholytic type, e.g., perfluoroalkylbetaine; a cationic type, e.g., perfluoroalkyltrimethylammonium salt; and a nonionic type, e.g., perfluoroalkylamine oxide, perfluoroalkylethylene oxide adducts, oligomers containing a perfluoroalkyl group and a hydrophilic group, oligomers containing a perfluoroalkyl group and a lipophilic group, oligomers containing a perfluoroalkyl group, a hydrophilic group, and a lipophilic group, and urethane containing a perfluoroalkyl group and a lipophilic group.

These surfactants can be used alone or in combination of two or more, and they are added to a developing solution in an amount of preferably from 0.001 to 10 wt %, and more preferably from 0.01 to 5 wt %.

Various development stabilizers can be used in a developing solution. The polyethylene glycol adducts of sugar alcohols disclosed in Japanese Patent Laid-Open No. 282079/1994, tetraalkylammonium salts such as tetrabutylammonium hydroxide, phosphonium salts such as tetrabutylphosphonium bromide, and iodonium salts such as diphenyliodonium chloride are exemplified as the preferred examples of such development stabilizers. Further, the anionic surfactants and ampholytic surfactants disclosed in Japanese Patent Laid-Open No. 51324/1975, the water-soluble cathionic polymers disclosed in Japanese Patent Laid-Open No. 95946/1980, and the water-soluble ampholytic high molecular weight electrolyte disclosed in Japanese Patent Laid-Open No. 142528/1981 can also be exemplified.

In addition to the above compounds, the following compounds can be exemplified as development stabilizers, e.g., the adduct of organic boron compounds with alkylene glycol disclosed in Japanese Patent Laid-Open No. 84241/1984, the polyoxyethylene-polyoxypropylene block polymer type water-soluble surfactants disclosed in Japanese Patent Laid-Open No. 111246/1985, the polyoxyethylene-polyoxypropylene-substituted alkylenediamine compounds disclosed in Japanese Patent Laid-Open No. 129750/1985, the polyethylene glycol having a weight average molecular weight of 300 or more disclosed in Japanese Patent Laid-Open No. 215554/1986, the fluorine-containing surfactants having a cationic group disclosed in Japanese Patent Laid-Open No. 175858/1988, the water-soluble ethylene oxide adducts obtained by adding 4 mols or more of ethylene oxide to acid or alcohol disclosed in Japanese Patent Laid-Open No. 39157/1990, and water-soluble polyalkylene compounds.

An organic solvent is added to a developing solution, if necessary. Such an organic solvent has solubility in water of 10 wt % or less, preferably 5 wt % or less, e.g., 1-phenylethanol, 2-phenylethanol, 3-phenyl-1-propanol, 4-phenyl-1-butanol, 4-phenyl-2-butanol, 2-phenyl-1-butanol, 2-phenoxyethanol, 2-benzyloxyethanol, o-methoxybenzyl alcohol, m-methoxybenzyl alcohol, p-methoxybenzyl alcohol, benzyl alcohol, cyclohexanol, 2-methylcyclohexanol, 3-methyl-cyclohexanol, 4-methylcyclohexanol, N-phenylethanolamine, and N-phenyldiethanolamine can be exemplified.

The content of an organic solvent is from 0.1 to 5 wt % based on the total weight of the working solution. The use amount of an organic solvent is intimately related with the use amount of a surfactant, and it is preferred to increase the amount of a surfactant as the amount of an organic solvent increases. This is because when the amount of a surfactant is scarce and the amount of an organic solvent is predominant, the organic solvent does not dissolve completely, and good developing property cannot be expected.

Moreover, a reducing agent can be added to a developing solution. A reducing agent is added in order to prevent a printing plate from being contaminated. As preferred organic reducing agents, phenol compounds, e.g., thiosalicylic acid, hydroquinone, metol, methoxyquinone, resorcinol, and 2-methylresorcinol, and amine compounds, e.g., phenylenediamine and phenylhydrazine are exemplified. The examples of more preferred inorganic reducing agents include sodium salt, potassium salt and ammonium salt of inorganic acid such as sulfurous acid, sulfurous acid hydroacid, phosphorous acid, phosphorous acid hydroacid, phosphorous acid dihydroacid, thiosulfuric acid, and dithionic acid.

Of these reducing agents, sulfite is particularly excellent in contamination preventing effect. The amount of these reducing agents is from 0.05 to 5 wt % based on the developing solution on use.

Further, a developing agent can contain an organic carboxylic acid. Preferred organic carboxylic acids are aliphatic and aromatic carboxylic acids having from 6 to 20 carbon atoms. The specific examples of aliphatic carboxylic acids include caproic acid, enanthylic acid, caprylic acid, lauric acid, myristic acid, palmitic acid, and stearic acid, and alkanoic acid having from 8 to 12 carbon atoms is particularly preferred. Further, unsaturated fatty acids having a double bond in the carbon chain can be used, or the carbon chain may be branched. The examples of aromatic carboxylic acids include compounds in which a benzene ring, naphthalene ring, or anthracene ring is substituted with a carboxylic group, specifically o-chlorobenzoic acid, p-chlorobenzoic acid, o-hydroxybenzoic acid, p-hydroxybenzoic acid, o-aminobenzoic acid, p-aminobenzoic acid, 2,4-dihydroxybenzoic acid, 2,5-dihydroxybenzoic acid, 2,6-dihydroxybenzoic acid, 2,3-dihydroxybenzoic acid, 3,5-dihydroxybenzoic acid, gallic acid, 1-hydroxy-2-naphthoic acid, 3-hydroxy-2-naphthoic acid, 2-hydroxy-1-naphthoic acid, 1-naphthoic acid, and 2-naphthoic acid, and hydroxynaphthoic acid is particularly effectively used.

It is preferred to use these aliphatic and aromatic carboxylic acids as sodium salt, potassium salt or ammonium salt for heightening water solubility. The content of organic carboxylic acids for use in a developing solution is not particularly limited, but when their content is lower than 0.1 wt %, sufficient effect cannot be obtained, and when it is more than 10 wt %, not only further effect cannot be obtained but the solubility of other additives used in combination is sometimes hindered. Accordingly, the preferred content of an organic carboxylic acid is from 0.1 to 10 wt % based on the developing solution on use, more preferably from 0.5 to 4 wt %.

Further, if necessary, a developing solution can contain antiseptics, coloring agents, thickeners, defoaming agents and water softeners. The examples of water softeners include, e.g., polyphosphoric acid, and the sodium salt, potassium salt and ammonium salt thereof, aminopolycarboxylic acid, e.g., ethylenediaminetetraacetic acid, diethylenetriaminepentaacetic acid, triethylenetetraminehexaacetic acid, hydroxyethylethylenediaminetriacetic acid, nitrilotriacetic acid, 1,2-diaminocyclohexanetetraacetic acid, and 1,3-diamino-2-propanoltetraacetic acid, and the sodium salt, potassium salt and ammonium salt thereof, aminotri(methylenephosphonic acid), ethylenediaminetetra(methylenephosphonic acid), diethylenetriaminepenta(methylenephosphonic acid), triethylenetetraminehexa(methylenephosphonic acid), hydroxyethylethylenediaminetri(methylenephosphonic acid), and 1-hydroxyethaene-1,1-diphosphonic acid, and the sodium salt, potassium salt and ammonium salt thereof.

The optimal value of water softeners varies according to the chelation, the hardness and the amount of hard water to be used but is generally from 0.01 to 5 wt % based on the developing solution on use, more preferably from 0.01 to 0.5 wt %. When the addition amount is less than this range, the expected effect cannot be obtained sufficiently, and when the amount is higher than this range, adverse effects on the image area comes to appear, such as color missing. The remainder of the component of a developing solution is water. From the viewpoint of transportation, it is convenient to prepare a developing solution in concentration with less water content to dilute with water on use. The concentration in this case is preferably such a degree that each component does not separate or precipitate.

The developing solution disclosed in Japanese Patent Laid-Open No. 282079/1994 can also be used as a developing solution for a lithographic printing plate using the photosensitive composition according to the present invention. This is a developing solution containing silicic acid alkali metal salt having an $SiO_2/M_2O$ (M represents alkali metal) in molar ratio of from 0.5 to 2.0, and a water-soluble ethylene oxide adduct obtained by adding 5 mols or more ethylene oxide to a sugar alcohol having 4 or more hydroxyl groups. The sugar alcohol is a polyhydric alcohol corresponding to the alcohol in which the aldehyde group and the ketone group of the sugar are reduced to make a primary alcohol and a secondary alcohol. The specific examples of sugar alcohols include D- and L-threitol, erythritol, D- and L-arabitol, ribitol, xylitol, D- and L-sorbitol, D- and L-mannitol, D- and L-iditol, D- and L-talitol, dulicitol, and allodulcitol. Further, di-, tri-, tetra-, penta- and hexa-glycerol which are condensation products of sugar alcohol can also be exemplified. The above water-soluble ethylene oxide adduct can be obtained by adding 5 mols or more ethylene oxide to 1 mol of sugar alcohol. Further, if necessary, the ethylene oxide adduct may be block copolymerized with a propylene oxide in the range so as not to hinder the solubility. The ethylene oxide adducts may be used alone or in combination of two or more.

The addition amount of water-soluble ethylene oxide adducts is preferably from 0.001 to 5 wt % based on the developing solution (working solution), more preferably from 0.001 to 2 wt %.

Various surfactants and organic solvents can be added to a developing solution according to necessity with a view to accelerating development, dispersing developer scum, and increasing the affinity to ink of the image area of a printing plate.

A PS plate development treated with a developing solution having the above composition is post-treated with a washing water, a rinsing water containing a surfactant, a finisher or a protective mucilage containing gum arabic and starch derivatives as main components. In the post-treatment of the PS plate according to the present invention, these treatments are used in various combinations.

In recent years, an automatic processor for a PS plate is used prevailingly in the plate-making and printing industry for the purpose of rationalization and standardization of plate-making work. Such automatic processors in general consist of a development part and a post-treatment part and equipped with a conveying unit of a PS plate, processing solution tanks, and spraying unit. Development and post-treatment are performed by spraying each processing solution pumped up to the exposed PS plate by means of a spray nozzle while conveying the PS plate horizontally. A processing method by immersion-conveying a PS plate through a processing solution tank filled with a processing solution by means of guide rolls in liquid, and a method of washing the plate surface after development by supplying a certain small amount of a washing water and reusing the waste solution as a diluent solution of a concentrated developing solution are also known.

In such automatic processing, processing can be carried out with replenishing each replenisher to each processing solution corresponding to the processing amount, the operating time, etc. Moreover, a nonreturnable system in which processing is carried out with substantially a virgin solution is also applicable. A lithographic printing plate obtained through these processes is mounted on an offset printing press and used for printing a lot of sheets.

EXAMPLE

The present invention is described in detail below with reference to the specific examples, but it should not be construed as the present invention is limited thereto.

Manufacture of Support:

Supports A, B, C, D and E were manufactured by using JIS-A-1050 aluminum plate and performing treatments by combining processes shown below.

(a) Mechanical Surface Roughening Treatment:

Mechanical surface roughening treatment of the aluminum plate was performed with supplying an abrasive slurry of a suspension comprising water and an abrasive (siliceous sand) having a specific gravity of 1.12 on the surface of the aluminum plate by a rotating roller-like nylon brush. The average particle size of the abrasive was 8 μm, and the maximum particle size was 50 μm. The material of the nylon brush was 6.10 nylon, the hair length was 50 mm, and the hair diameter was 0.3 mm. A stainless steel barrel having a diameter of 300 mm was perforated and nylon hair was planted densely to prepare a nylon brush. Three rotary brushes were used. The distance between two supporting rollers (φ200 mm) at the lower part of each brush was 300 mm. The brush rollers were pressed against the aluminum plate until the load of the driving motor rotating the brushes came to the value of the load before pressing the brush rollers against the aluminum plate plus 7 kW. The direction of rotation of brushes was the same with the moving direction of the aluminum plate. The rotation number of the brushes was 200 rpm.

(b) Alkali Etching Treatment:

The above-obtained aluminum plate was subjected to spray etching treatment with an NaOH aqueous solution (concentration: 2.6 wt %, an aluminum ion in concentration: 6.5 wt %) at 70° C., thereby 6 g/m$^2$ of the aluminum plate was dissolved. The plate was then washed with well water by spraying.

(c) Desmutting Treatment:

The aluminum plate was subjected to spray desmutting treatment with an aqueous solution containing a nitric acid in concentration of 1 wt % (containing 0.5 wt % of an aluminum ion) at 30° C., and then the plate was washed with water by spraying. The aqueous solution of nitric acid used in the desmutting treatment was the waste solution in the process of electrochemical surface roughening treatment by alternating current in an aqueous solution of nitric acid.

(d) Electrochemical Surface Roughening Treatment:

Electrochemical surface roughening treatment was performed continuously by alternating voltage of 60 Hz. The electrolyte at this time was an aqueous solution containing 10.5 g/liter of a nitric acid (containing 5 g/liter of an aluminum ion) and the temperature was 50° C. The time TP required for the electric current to reach the peak from 0 was 0.8 msec, the DUTY ratio was 1/1, and electrochemical surface roughening treatment was performed using trapezoidal rectangular wave form alternating current with a carbon electrode as the counter electrode. Ferrite was used as the supporting anode. A radial cell type electrolytic bath was used.

The electric current density was 30 A/dm$^2$ at a peak value of electric current, and the quantity of electricity was 220 C/dm$^2$ in the quantity of electricity of sum total in the case where the aluminum plate was the anode. Five percent of the electric current from the electric source was diverted to the supporting anode.

The aluminum plate was then washed with well water by spraying.

(e) Alkali Etching Treatment:

The aluminum plate was subjected to etching treatment by spraying with an aqueous solution comprising a sodium hydroxide in concentration of 26 wt % and an aluminum ion in concentration of 6.5 wt % at 32° C., thereby 0.20 g/m$^2$ of the aluminum plate was dissolved. A smut mainly comprising an aluminum hydroxide which was formed when electrochemical surface roughening treatment was performed by alternating voltage in the prior stage was desmutted, and also the edge parts of the pits formed were dissolved to smooth the edge part, and then the aluminum plate was washed with well water by spraying.

(f) Desmutting Treatment

The aluminum plate was subjected to spray desmutting treatment with an aqueous solution containing a sulfuric acid in concentration of 15 wt % (containing 4.5 wt % of an aluminum ion) at 30° C., and then washed with well water by spraying. The aqueous solution of nitric acid used in the desmutting treatment was the waste solution in electrochemical surface roughening treatment using an aqueous solution of nitric acid by alternating current.

(g) Electrochemical Surface Roughening Treatment:

Electrochemical surface roughening treatment was performed continuously by alternating voltage of 60 Hz. The electrolyte at this time was an aqueous solution containing 7.5 g/liter of a hydrochloric acid (containing 5 g/liter of an aluminum ion) and the temperature was 35° C. The wave form of the AC electric source was rectangular and electrochemical surface roughening treatment was performed with a carbon electrode as the counter electrode. Ferrite was used as the supporting anode. A radial cell type electrolytic bath was used.

The electric current density was 25 A/dm$^2$ at a peak value of electric current, and the quantity of electricity was 50 C/dm$^2$ in the quantity of electricity of sum total in the case where the aluminum plate was the anode.

The aluminum plate was then washed with well water by spraying.

(h) Alkali Etching Treatment:

The aluminum plate was subjected to etching treatment by spraying with an aqueous solution comprising a sodium hydroxide in concentration of 26 wt % and an aluminum ion in concentration of 6.5 wt % at 32° C., thereby 0.10 g/m$^2$ of the aluminum plate was dissolved. A smut mainly comprising an aluminum hydroxide which was formed when electrochemical surface roughening treatment was performed by alternating voltage in the prior stage was desmutted, and also the edge parts of the pits formed were dissolved to smooth the edge part, and then the aluminum plate was washed with well water by spraying.

(i) Desmutting Treatment

The aluminum plate was subjected to spray desmutting treatment with an aqueous solution containing a sulfuric acid in concentration of 25 wt % (containing 0.5 wt % of an aluminum ion) at 60° C., and then washed with well water by spraying.

(j) Anodic Oxidation Treatment:

A sulfuric acid was used as the electrolyte. Every electrolyte contained a sulfuric acid in concentration of 170 g/liter (containing 0.5 wt % of an aluminum ion) and the temperature of the electrolyte was 43° C. The aluminum plate was then washed with well water by spraying.

The electric current density was about 30 A/dm$^2$. The final amount of the oxide film was 2.7 g/m$^2$.

Support A:

Support A was manufactured by performing each of the above processes (a) to (j) in order so that the etching amount in process (e) became 3.5 g/m$^2$.

Support B:

Support B was manufactured by performing each of the above processes in order except for omitting processes (g), (h) and (i).

Support C:

Support C was manufactured by performing each of the above processes in order except for omitting processes (a), (g), (h) and (i).

Support D:

Support D was manufactured by performing each of the above processes in order except for omitting processes (a), (d), (e) and (f) so that the quantity of electricity of sum total in process (g) became 450 C/dm$^2$.

The thus-obtained support A, B, C and D were successively subjected to the following hydrophilizing treatment and subbing treatment.

(k) Treatment with Alkali Metal Silicate:

Treatment with alkali metal silicate (silicate treatment) was performed by immersing the aluminum support obtained by anodic oxidation treatment in a treating tank containing 1 wt % aqueous solution of disodium trisilicate at 30° C. for 10 seconds. The aluminum plate was then washed with well water by spraying. The amount of silicate adhered on the plate was 3.5 mg/m².

(1) Formation of Subbing Layer:

A coating solution for forming a subbing layer having the composition shown below was coated on the aluminum support subjected to treatment with alkali metal silicate, and then the support was dried at 80° C. for 15 seconds. The dry coating weight was 15 mg/m².

Composition of Subbing Layer Coating Solution:

| High molecular weight compound shown below | 0.3 g |
|---|---|

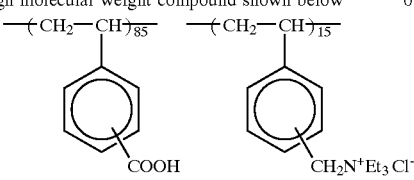

| Methanol | 100 g |
|---|---|
| Water | 1 g |

Examples I-1 to I-32 and Comparative Examples I-1 to I-3

The photosensitive solution having the composition shown below was coated on the above-obtained support, dried in an oven at 150° C. for 1 minute, thereby a positive photosensitive lithographic printing plate having a positive infrared-sensitive photosensitive composition layer having a layer thickness of 2.0 g/m² was obtained.

Composition of Photosensitive Solution:

| m-, p-Cresol novolak (m/p ratio = 6/4, weight average molecular weight: 7,500, containing 0.5 wt % of unreacted cresol) | amount is shown in Table I-1 |
|---|---|
| Acrylate resin (A) (shown in Table I-1) | amount is shown in Table I-1 |
| A light-to-heat converting substance shown below (cyanine dye A) | 0.04 g |

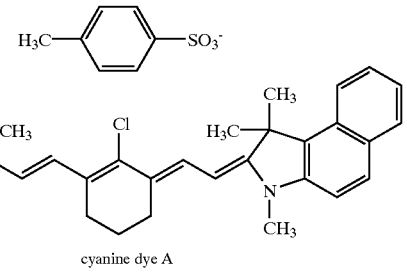

cyanine dye A

| 2,4,6-Tris(hexyloxy)benzenediazonium-2-hydroxy-4-methoxybenzophenone-5-sulfonate | 0.01 g |
|---|---|
| p-Toluenesulfonic acid | 0.002 g |
| Tetrahydrophthalic anhydride | 0.05 g |
| A dye obtained by replacing the counter anion of Victoria Pure Blue BOH with 1-naphthalenesulfonate anion | 0.015 g |
| Fluorine surfactant, Megafac F-176 (manufactured by Dainippon Chemicals and Ink Co., Ltd.) | 0.02 g |
| Methyl ethyl ketone | 15 g |
| 1-Methoxy-2-propanol | 7 g |

<Evaluation of Photosensitive Lithographic Printing Plate>
Evaluation of Development Latitude:

A test pattern was imagewise drawn on the above-obtained photosensitive lithographic printing plate with Trendsetter (manufactured by Creo Co.) by beam intensity of 9 W and drum revolving speed of 150 rpm.

Thereafter, the printing plate was subjected to development with PS Processor 900H (manufactured by Fuji Photo Film Co., Ltd.) charged with an alkali developing solution at liquid temperature of 30° C. and developing time for 20 seconds. The difference between the highest electrical conductance and the lowest electrical conductance of the developing solution which effected good development without being accompanied by the elution of the image area, staining and coloring attributing to the residual film of the photosensitive layer by development failure was taken as development latitude and evaluated. The results obtained are shown in Table I-1 below.

| Composition of alkali developing solution A | |
|---|---|
| $SiO_2.K_2O$ ($K_2O/SiO_2$ = 1/1 (molar ratio)) | 4.0 wt % |
| Citric acid | 0.5 wt % |
| Polyethylene glycol lauryl ether (weight average molecular weight: 1,000) | 0.5 wt % |
| Water | 95.0 wt % |
| Composition of alkali developing solution B | |
| D-sorbitol | 2.5 wt % |
| Sodium hydroxide | 0.85 wt % |
| Polyethylene glycol lauryl ether (weight average molecular weight: 1,000) | 0.5 wt % |
| Water | 96.15 wt % |

Evaluation of Press Life:

The lithographic printing plate obtained at the electrical conductance of the developing solution which effected good development without being accompanied by the elution of the image area, staining and coloring attributing to the residual film of the photosensitive layer by development failure in the same manner as in the above evaluation of development latitude was used and printing was performed. Printing Press Lithron (manufactured by Komori Insatsuki Co., Ltd.) was used as the printing press and DIC-GEOS (N) sumi (manufactured by Dainippon Chemicals and Ink Co., Ltd.) was used as the ink. The press life was evaluated by the number of printed sheets of the time when it was confirmed by visual observation that the density of the solid image began to be light. The results obtained are shown in Table I-1 below.

Evaluation of Press Life After Burning Treatment:

The printing plate of the lithographic printing plate obtained by development in the same manner as in the above evaluation of press life was wiped with a plate-adjusting solution BC-3 for burning (manufactured by Fuji Photo Film Co., Ltd.), and then subjected to burning treatment at about 240° C. for 7 minutes. The printing plate was then washed with water and then treated with gum GU-7 (manufactured by Fuji Photo Film Co., Ltd.) diluted with water to 2 times in volume.

Subsequently, printing was performed by Printing Press Lithron (manufactured by Komori Insatsuki Co., Ltd.) and DIC-GEOS (N) sumi (manufactured by Dainippon Chemicals and Ink Co., Ltd.). The press life after burning treatment was evaluated by the number of printed sheets of the time when it was confirmed by visual observation that the density of the solid image began to be light. The results obtained are shown in Table I-1 below.

TABLE I-1

| Example No. | Support | Amount of Novolak (g) | Total Amount (g) | Acrylate Resin (A) ||||||||| Development Latitude || Press Life ||
| | | | | Monomer-a | Amount (mol %) | Monomer-b | Amount (mol %) | Monomer-c | Amount (mol %) | Monomer-d | Amount (mol %) | Mol. Wt. | Developing Solution A (mS/cm) | Developing Solution B (mS/cm) | With Burning Treatment (number of sheets) | Without Burning Treatment (number of sheets) |
|---|---|---|---|---|---|---|---|---|---|---|---|---|---|---|---|---|
| Ex. I-1 | A | 0.90 | 0.10 | a-1 | 16 | b-11 | 84 | — | — | — | — | 55,000 | 5 | 6 | 110,000 | 240,000 |
| Ex. I-2 | B | 0.80 | 0.20 | a-1 | 20 | b-14 | 74 | — | — | — | — | 55,000 | 6 | 7 | 110,000 | 240,000 |
| Ex. I-3 | C | 0.70 | 0.30 | a-1 | 26 | b-14 | 80 | — | — | — | — | 55,000 | 6 | 7 | 110,000 | 240,000 |
| Ex. I-4 | D | 0.70 | 0.30 | a-1 | 33 | b-14 | 67 | — | — | — | — | 65,000 | 6 | 7 | 90,000 | 210,000 |
| Ex. I-5 | B | 0.60 | 0.40 | a-1 | 13 | b-3 | 87 | — | — | — | — | 50,000 | 6 | 6 | 120,000 | 250,000 |
| Ex. I-6 | C | 0.50 | 0.50 | a-1 | 23 | b-3 | 77 | — | — | — | — | 50,000 | 4 | 5 | 120,000 | 250,000 |
| Ex. I-7 | C | 0.90 | 0.10 | a-1 | 13 | — | — | c-3 | 87 | — | — | 50,000 | 5 | 6 | 120,000 | 250,000 |
| Ex. I-8 | B | 0.80 | 0.20 | a-1 | 26 | — | — | c-4 | 64 | — | — | 48,000 | 6 | 7 | 120,000 | 250,000 |
| Ex. I-9 | C | 0.70 | 0.30 | a-1 | 33 | — | — | c-5 | 67 | — | — | 29,000 | 6 | 7 | 90,000 | 180,000 |
| Ex. I-10 | B | 0.70 | 0.30 | a-1 | 33 | — | — | c-9 | 67 | — | — | 80,000 | 6 | 7 | 90,000 | 200,000 |
| Ex. I-11 | B | 0.70 | 0.30 | a-1 | 13 | — | — | c-10 | 87 | — | — | 35,000 | 6 | 7 | 110,000 | 240,000 |
| Ex. I-12 | B | 0.70 | 0.50 | a-1 | 10 | b-1 | 37 | c-10 | 53 | — | — | 65,000 | 4 | 5 | 120,000 | 250,000 |
| Ex. I-13 | B | 0.90 | 0.10 | a-1 | 21 | b-1 | 37 | c-1 | 42 | — | — | 33,000 | 5 | 6 | 120,000 | 200,000 |
| Ex. I-14 | B | 0.80 | 0.20 | a-1 | 37 | b-7 | 50 | c-1 | 13 | — | — | 40,000 | 6 | 7 | 90,000 | 180,000 |
| Ex. I-15 | B | 0.90 | 0.30 | a-1 | 4 | b-7 | 43 | c-2 | 53 | — | — | 50,000 | 6 | 6 | 120,000 | 230,000 |
| Ex. I-16 | B | 0.90 | 0.30 | a-1 | 6 | b-4 | 25 | c-2 | 50 | d-1 | 19 | 48,000 | 5 | 6 | 120,000 | 230,000 |
| Ex. I-17 | B | 0.90 | 0.20 | a-1 | 28 | b-5 | 6 | c-2 | 30 | d-2 | 36 | 40,000 | 5 | 6 | 120,000 | 230,000 |
| Ex. I-18 | B | 0.90 | 0.30 | a-1 | 20 | b-9 | 31 | c-2 | 30 | d-3 | 19 | 30,000 | 5 | 6 | 120,000 | 200,000 |
| Ex. I-19 | B | 0.90 | 0.10 | a-2 | 30 | b-10 | 70 | — | — | — | — | 45,000 | 6 | 7 | 100,000 | 200,000 |
| Ex. I-20 | B | 0.80 | 0.20 | a-2 | 25 | b-10 | 75 | — | — | — | — | 60,000 | 6 | 7 | 100,000 | 200,000 |
| Ex. I-21 | B | 0.80 | 0.20 | a-2 | 30 | b-14 | 70 | — | — | — | — | 45,000 | 6 | 6 | 100,000 | 200,000 |
| Ex. I-22 | B | 0.70 | 0.30 | a-2 | 30 | — | — | c-1 | 70 | — | — | 45,000 | 4 | 5 | 100,000 | 200,000 |
| Ex. I-23 | B | 0.60 | 0.40 | a-2 | 30 | — | — | c-3 | 70 | — | — | 45,000 | 4 | 6 | 100,000 | 190,000 |
| Ex. I-24 | B | 0.90 | 0.10 | a-2 | 30 | — | — | c-10 | 70 | — | — | 10,000 | 5 | 6 | 90,000 | 200,000 |
| Ex. I-25 | B | 0.90 | 0.20 | a-2 | 30 | b-10 | 70 | c-1 | 70 | — | — | 80,000 | 5 | 6 | 110,000 | 200,000 |
| Ex. I-26 | B | 0.90 | 0.20 | a-2 | 28 | b-16 | 35 | c-3 | 37 | — | — | 40,000 | 6 | 7 | 100,000 | 200,000 |
| Ex. I-27 | B | 0.90 | 0.20 | a-2 | 20 | b-3 | 26 | c-6 | 54 | — | — | 30,000 | 6 | 7 | 100,000 | 200,000 |
| Ex. I-28 | B | 0.50 | 0.30 | a-2 | 5 | b-3 | 10 | c-10 | 85 | — | — | 30,000 | 5 | 6 | 100,000 | 200,000 |
| Ex. I-29 | B | 0.70 | 0.30 | a-2 | 10 | b-3 | 20 | c-10 | 70 | d-1 | 19 | 50,000 | 5 | 6 | 100,000 | 190,000 |
| Ex. I-30 | B | 0.60 | 0.40 | a-2 | 20 | b-3 | 32 | c-6 | 52 | d-2 | 36 | 48,000 | 5 | 6 | 100,000 | 180,000 |
| Ex. I-31 | B | 0.50 | 0.50 | a-2 | 28 | b-16 | 52 | c-6 | 20 | d-3 | 19 | 40,000 | 4 | 5 | 100,000 | 180,000 |
| Ex. I-32 | B | 0.40 | 0.60 | a-1 | 26 | — | — | — | — | d-2 | 74 | 55,000 | 1 | 1 | 70,000 | 100,000 |
| Comp. Ex. I-1 | B | 0.90 | 0.10 | a-1 | 24 | — | — | — | — | — | 76 | 40,000 | 2 | 2 | 80,000 | 160,000 |
| Comp. Ex. I-2 | B | 0.90 | 0.10 | a-2 | 36 | — | — | — | — | d-2 | 64 | 53,000 | 2 | 2 | 80,000 | 160,000 |
| Comp. Ex. I-3 | | | | | | | | | | | | | | | | |

The copolymer components used in Acrylate Resin (A) in Table I-1 are shown below.

Monomer-a: (Meth)acrylic Acid
   a-1: Acrylic acid
   a-2: Methacrylic acid
Monomer-b: Styrene Derivative
   Exemplified compounds b-1 to b-18
Monomer-c: Acrylamide Derivative
   Exemplified compounds c-1 to c-10
Monomer-d: (Meth)acrylic Ester
   d-1: Methyl acrylate
   d-2: Methyl methacrylate
   d-3: Ethyl methacrylate It is apparent from the results in Table I-1 that the samples in Examples I-1 to I-32 are excellent in development latitude as compared with the samples in Comparative Examples I-1 to I-3, in particular, excellent when burning treatment is performed.

The infrared-sensitive photosensitive composition in the present invention is excellent in development latitude and press life, in particular, the present invention can provide an infrared-sensitive photosensitive composition for use in the image-forming layer of a positive lithographic printing plate precursor for so-called direct plate-making capable of directly plate-making from digital signals such as computer data.

Examples II-1 to II-37 and Comparative Examples II-1 to II-3

The photosensitive solution having the composition shown below was coated on the above-obtained support, dried in an oven at 150° C. for 1 minute, thereby a positive photosensitive lithographic printing plate having a positive infrared-sensitive photosensitive composition layer having a layer thickness of 2.0 g/m² was obtained.

Composition of Photosensitive Solution:

| | |
|---|---|
| m-, p-Cresol novolak (m/p ratio = 6/4, weight average molecular weight: 7,500, containing 0.5 wt % of unreacted cresol) | amount is shown in Table II-1 |
| Resin (A) (shown in Table II-1) | amount is shown in Table II-1 |
| A light-to-heat converting substance shown below (cyanine dye A) | 0.04 g |

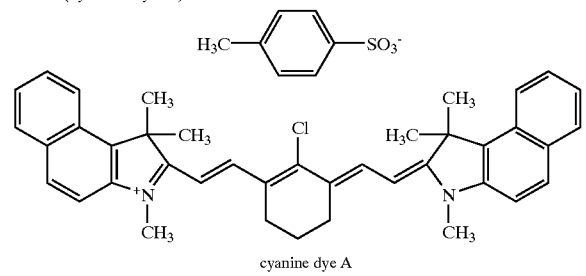

cyanine dye A

| | |
|---|---|
| 2,4,6-Tris(hexyloxy)benzenediazonium-2-hydroxy-4-methoxybenzophenone-5-sulfonate | 0.01 g |
| p-Toluenesulfonic acid | 0.002 g |
| Tetrahydrophthalic anhydride | 0.05 g |
| A dye obtained by replacing the counter anion of Victoria Pure Blue BOH with 1-naphthalenesulfonate anion | 0.015 g |
| Fluorine surfactant, Megafac F-176 (manufactured by Dainippon Chemicals and Ink Co., Ltd.) | 0.02 g |
| Methyl ethyl ketone | 15 g |
| 1-Methoxy-2-propanol | 7 g |

<Evaluation of Photosensitive Lithographic Printing Plate>
Evaluation of Development Latitude:

A test pattern was imagewise drawn on the above-obtained photosensitive lithographic printing plate with Trendsetter (manufactured by Creo Co.) by beam intensity of 9 W and drum revolving speed of 150 rpm.

Thereafter, the printing plate was subjected to development with PS Processor 900H (manufactured by Fuji Photo Film Co., Ltd.) charged with an alkali developing solution at liquid temperature of 30° C. and developing time for 20 seconds. The difference between the highest electrical conductance and the lowest electrical conductance of the developing solution which effected good development without being accompanied by the elution of the image area, staining and coloring attributing to the residual film of the photosensitive layer by development failure was taken as development latitude and evaluated. The results obtained are shown in Table II-1 below.

| | |
|---|---|
| Composition of alkali developing solution A | |
| SiO$_2$.K$_2$O (K$_2$O/SiO$_2$ = 1/1 (molar ratio) | 4.0 wt % |
| Citric acid | 0.5 wt % |
| Polyethylene glycol lauryl ether (weight average molecular weight: 1,000) | 0.5 wt % |
| Water | 95.0 wt % |
| Composition of alkali developing solution B | |
| D-sorbitol | 2.5 wt % |
| Sodium hydroxide | 0.85 wt % |
| Polyethylene glycol lauryl ether (weight average molecular weight: 1,000) | 0.5 wt % |
| Water | 96.15 wt % |

Evaluation of Press Life:

The lithographic printing plate obtained at the electrical conductance of the developing solution which effected good development without being accompanied by the elution of the image area, staining and coloring attributing to the residual film of the photosensitive layer by development failure in the same manner as in the above evaluation of development latitude was used and printing was performed. Printing Press Lithron (manufactured by Komori Insatsuki Co., Ltd.) was used as the printing press and DIC-GEOS (N) sumi (manufactured by Dainippon Chemicals and Ink Co., Ltd.) was used as the ink. The press life was evaluated by the number of printed sheets of the time when it was confirmed by visual observation that the density of the solid image began to be light. The results obtained are shown in Table II-1 below.

Evaluation of Press Life After Burning Treatment:

The printing plate of the lithographic printing plate obtained by development in the same manner as in the above evaluation of press life was wiped with a plate-adjusting solution BC-3 for burning (manufactured by Fuji Photo Film Co., Ltd.), and then subjected to burning treatment at about 240° C. for 7 minutes. The printing plate was then washed with water and then treated with gum GU-7 (manufactured by Fuji Photo Film Co., Ltd.) diluted with water to 2 times in volume.

Subsequently, printing was performed by Printing Press Lithron (manufactured by Komori Insatsuki Co., Ltd.) and DIC-GEOS (N) sumi (manufactured by Dainippon Chemicals and Ink Co., Ltd.). The press life after burning treatment was evaluated by the number of printed sheets of the time when it was confirmed by visual observation that the density of the solid image began to be light. The results obtained are shown in Table II-1 below.

TABLE II-1

| Example No. | Support | Amount of Novolak (g) | Total Amount (g) | Acrylate Resin (A) Monomer-a | Amount (mol %) | Monomer-b | Amount (mol %) | Monomer-c | Amount (mol %) | Monomer-d | Amount (mol %) | Mol. Wt. | Development Latitude Developing Solution A (mS/cm) | Developing Solution B (mS/cm) | Press Life With Burning Treatment (number of sheets) | Press Life Without Burning Treatment (number of sheets) |
|---|---|---|---|---|---|---|---|---|---|---|---|---|---|---|---|---|
| Ex. II-1 | A | 0.90 | 0.10 | a-1 | 16 | b-11 | 84 | — | — | — | — | 55,000 | 5 | 6 | 110,000 | 240,000 |
| Ex. II-2 | B | 0.80 | 0.20 | a-1 | 20 | b-14 | 74 | — | — | — | — | 55,000 | 6 | 7 | 110,000 | 240,000 |
| Ex. II-3 | C | 0.70 | 0.30 | a-1 | 26 | b-14 | 80 | — | — | — | — | 55,000 | 6 | 7 | 110,000 | 240,000 |
| Ex. II-4 | D | 0.70 | 0.30 | a-3 | 33 | b-14 | 67 | — | — | — | — | 65,000 | 6 | 7 | 90,000 | 210,000 |
| Ex. II-5 | B | 0.70 | 0.40 | a-5 | 13 | b-3 | 87 | — | — | — | — | 50,000 | 5 | 6 | 120,000 | 250,000 |
| Ex. II-6 | C | 0.50 | 0.50 | a-6 | 23 | b-3 | 77 | — | — | — | — | 50,000 | 4 | 5 | 120,000 | 250,000 |
| Ex. II-7 | C | 0.90 | 0.10 | a-1 | 13 | — | — | c-3 | 87 | — | — | 50,000 | 5 | 6 | 120,000 | 250,000 |
| Ex. II-8 | B | 0.90 | 0.20 | a-1 | 26 | — | — | c-4 | 64 | — | — | 48,000 | 6 | 7 | 120,000 | 250,000 |
| Ex. II-9 | C | 0.70 | 0.30 | a-3 | 26 | — | — | c-5 | 64 | — | — | 48,000 | 6 | 7 | 120,000 | 250,000 |
| Ex. II-10 | B | 0.70 | 0.30 | a-5 | 33 | — | — | c-9 | 67 | — | — | 29,000 | 6 | 7 | 90,000 | 180,000 |
| Ex. II-11 | B | 0.70 | 0.30 | a-8 | 33 | — | — | c-10 | 67 | — | — | 80,000 | 7 | 7 | 90,000 | 200,000 |
| Ex. II-12 | B | 0.70 | 0.50 | a-8 | 13 | — | — | c-10 | 87 | — | — | 35,000 | 4 | 5 | 110,000 | 240,000 |
| Ex. II-13 | B | 0.90 | 0.10 | a-1 | 10 | b-1 | 37 | c-1 | 53 | — | — | 65,000 | 5 | 6 | 120,000 | 250,000 |
| Ex. II-14 | B | 0.90 | 0.20 | a-1 | 21 | b-1 | 37 | c-1 | 42 | — | — | 33,000 | 6 | 7 | 120,000 | 180,000 |
| Ex. II-15 | B | 0.90 | 0.30 | a-3 | 37 | b-7 | 50 | c-1 | 13 | — | — | 40,000 | 5 | 6 | 90,000 | 180,000 |
| Ex. II-16 | B | 0.90 | 0.30 | a-5 | 4 | b-7 | 43 | c-2 | 53 | — | — | 50,000 | 6 | 7 | 120,000 | 230,000 |
| Ex. II-17 | B | 0.90 | 0.20 | a-6 | 6 | b-4 | 25 | c-2 | 50 | d-1 | 19 | 48,000 | 5 | 6 | 120,000 | 230,000 |
| Ex. II-18 | B | 0.90 | 0.20 | a-8 | 28 | b-5 | 6 | c-2 | 30 | d-2 | 36 | 40,000 | 5 | 6 | 120,000 | 230,000 |
| Ex. II-19 | B | 0.90 | 0.30 | a-8 | 20 | b-9 | 31 | c-2 | 30 | d-3 | 19 | 30,000 | 5 | 6 | 120,000 | 230,000 |
| Ex. II-20 | B | 0.90 | 0.10 | a-12 | 30 | b-10 | 70 | — | — | — | — | 45,000 | 6 | 7 | 100,000 | 200,000 |
| Ex. II-21 | B | 0.80 | 0.20 | a-12 | 25 | b-10 | 75 | — | — | — | — | 60,000 | 6 | 7 | 100,000 | 200,000 |
| Ex. II-22 | B | 0.80 | 0.20 | a-14 | 30 | b-14 | 70 | — | — | — | — | 45,000 | 4 | 6 | 100,000 | 200,000 |
| Ex. II-23 | B | 0.70 | 0.30 | a-17 | 30 | — | — | c-1 | 70 | — | — | 45,000 | 5 | 6 | 100,000 | 200,000 |
| Ex. II-24 | B | 0.60 | 0.40 | a-18 | 30 | — | — | c-3 | 70 | — | — | 45,000 | 4 | 5 | 100,000 | 190,000 |
| Ex. II-25 | B | 0.90 | 0.10 | a-20 | 30 | — | — | c-10 | 70 | — | — | 10,000 | 5 | 6 | 90,000 | 200,000 |
| Ex. II-26 | B | 0.90 | 0.30 | a-21 | 10 | b-10 | 70 | c-1 | 70 | — | — | 80,000 | 5 | 6 | 110,000 | 200,000 |
| Ex. II-27 | B | 0.60 | 0.40 | a-22 | 20 | b-16 | 35 | c-3 | 37 | — | — | 40,000 | 6 | 7 | 100,000 | 200,000 |
| Ex. II-28 | B | 0.90 | 0.20 | a-22 | 28 | b-3 | 26 | c-6 | 54 | — | — | 30,000 | 4 | 5 | 100,000 | 200,000 |
| Ex. II-29 | B | 0.50 | 0.30 | a-24 | 33 | b-3 | 10 | c-6 | 85 | — | — | 30,000 | 6 | 7 | 100,000 | 190,000 |
| Ex. II-30 | B | 0.90 | 0.30 | a-24 | 38 | b-3 | 20 | c-10 | 70 | d-1 | 19 | 50,000 | 5 | 6 | 100,000 | 180,000 |
| Ex. II-31 | B | 0.60 | 0.40 | a-30 | 20 | b-3 | 32 | c-1 | 52 | d-2 | 36 | 48,000 | 5 | 6 | 110,000 | 180,000 |
| Ex. II-32 | B | 0.50 | 0.50 | a-30 | 28 | b-16 | 52 | c-3 | 20 | d-3 | 19 | 40,000 | 4 | 5 | 100,000 | 180,000 |
| Ex. II-33 | B | 0.90 | 0.10 | a-29 | 33 | b-3 | — | c-6 | — | d-3 | 67 | 77,000 | 6 | 7 | 100,000 | 200,000 |
| Ex. II-34 | B | 0.90 | 0.10 | a-29 | 38 | — | — | — | — | d-4 | 62 | 80,000 | 7 | 8 | 100,000 | 200,000 |
| Ex. II-35 | B | 0.90 | 0.10 | a-34 | 38 | — | — | — | — | d-4 | 62 | 109,000 | 6 | 7 | 100,000 | 200,000 |
| Ex. II-36 | B | 0.90 | 0.10 | a-35 | 43 | — | — | — | — | d-5 | 57 | 70,000 | 7 | 8 | 100,000 | 200,000 |
| Ex. II-37 | B | 0.90 | 0.10 | a-36 | 38 | — | — | — | — | d-5 | 62 | 75,000 | 7 | 8 | 100,000 | 200,000 |
| Comp. Ex. II-1 | B | 0.40 | 0.60 | methacrylic acid | 26 | b-3 | — | — | — | d-2 | 74 | 55,000 | 1 | 1 | 80,000 | 90,000 |
| Comp. Ex. II-2 | B | 0.90 | 0.10 | methacrylic acid | 24 | — | — | — | — | d-2 | 76 | 40,000 | 2 | 2 | 80,000 | 160,000 |
| Comp. Ex. II-3 | B | 0.90 | 0.10 | methacrylic acid | 36 | — | — | — | — | d-2 | 64 | 53,000 | 2 | 2 | 80,000 | 160,000 |

The copolymer components used in Resin (A) in Table II-1 are shown below.

Monomer-a: Monomer Represented by Formula (I)
  Exemplified compounds a-1 to a-36
Monomer-b: Styrene Derivative
  Exemplified compounds b-1 to b-17
Monomer-c: Acrylamide Derivative
  Exemplified compounds c-1 to c-10
Monomer-d: Acrylic Ester
  d-1: Methyl acrylate
  d-2: Methyl methacrylate
  d-3: Ethyl methacrylate
  d-4: Isopropyl methacrylate
  d-5: n-Butyl methacrylate It is apparent from the results in Table II-1 that the samples in Examples II-1 to II-37 are excellent in development latitude as compared with the samples in Comparative Examples II-1 to II-3, in particular, excellent when burning treatment is performed.

By using the infrared-sensitive photosensitive composition of the present invention in the photosensitive layer of a photosensitive lithographic printing plate, a photosensitive lithographic printing plate excellent in development latitude and press life (in particular, in the case where burning treatment is performed) can be obtained.

While the invention has been described in detail and with reference to specific examples thereof, it will be apparent to one skilled in the art that various changes and modifications can be made therein without departing from the spirit and scope thereof.

What is claimed is:

1. An infrared-sensitive photosensitive composition comprising:
  (A) a resin;
  (B) a novolak resin; and
  (C) a light-to-heat converting substance,
wherein the resin (A) has, as copolymer components, at least: (1) a monomer represented by formula (I): and (2) at least one compound selected from the group consisting of a (meth)acrylic ester, a (meth)acrylamide derivative, and a styrene derivative:

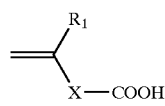

(I)

wherein $R_1$ represents a hydrogen atom or an alkyl group, and X represents an arylene group or one of groups represented by the following formulae:

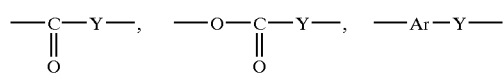

wherein Y represents a divalent linking group, and Ar represents an arylene group.

2. The infrared-sensitive photosensitive composition, according to claim 1, wherein X represents an arylene group.

3. The infrared-sensitive photosensitive composition, according to claim 1, wherein X represents one of groups represented by the following formulae:

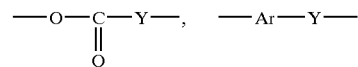

wherein Y represents a divalent linking group, and Ar represents an arylene group.

4. The infrared-sensitive photosensitive composition, according to claim 1, wherein X represents a group represented by the following formula:

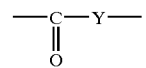

wherein Y represents $—NR_2—Z—$, $R_2$ represents a hydrogen atom or an alkyl group, and Z represents a divalent linking group.

5. The infrared-sensitive photosensitive composition, according to claim 1, wherein the component (1) is a monomer selected from the group consisting of the following compounds (a-29), (a-33), (a-34), (a-35) and (a-36):

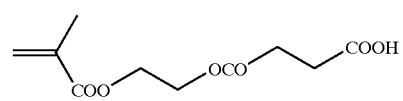
a-29

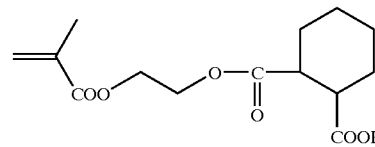
a-33

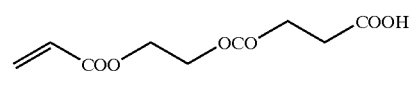
a-34

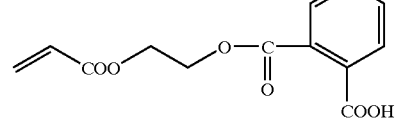
a-35

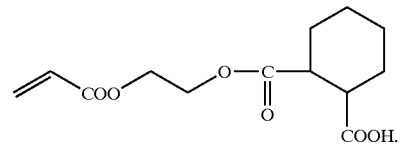
a-36

* * * * *